United States Patent
Harada

(10) Patent No.: US 12,089,172 B2
(45) Date of Patent: Sep. 10, 2024

(54) USER TERMINAL

(71) Applicant: NTT DOCOMO, INC., Tokyo (JP)

(72) Inventor: Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 21 days.

(21) Appl. No.: 17/054,006

(22) PCT Filed: May 10, 2018

(86) PCT No.: PCT/JP2018/018230
§ 371 (c)(1),
(2) Date: Nov. 9, 2020

(87) PCT Pub. No.: WO2019/215899
PCT Pub. Date: Nov. 14, 2019

(65) Prior Publication Data
US 2021/0092697 A1 Mar. 25, 2021

(51) Int. Cl.
*H04W 56/00* (2009.01)
*H04L 5/00* (2006.01)

(52) U.S. Cl.
CPC ......... *H04W 56/001* (2013.01); *H04L 5/0048* (2013.01)

(58) Field of Classification Search
CPC ..... H04W 24/10; H04W 24/08; H04W 48/12; H04W 36/0085; H04W 36/0083; H04W 72/0446; H04L 5/0023; H04L 67/12; H04L 5/0048; H04L 5/0051; H04L 5/0044; H04L 5/005; H04L 5/0007; H04L 5/0053; H04B 7/0695
See application file for complete search history.

(56) References Cited

U.S. PATENT DOCUMENTS

| | | | | |
|---|---|---|---|---|
| 2015/0358848 A1* | 12/2015 | Kim | ...................... | H04W 56/001 370/252 |
| 2016/0192350 A1* | 6/2016 | Yi | ......................... | H04L 5/0035 370/329 |
| 2018/0199344 A1* | 7/2018 | Liao | ........................ | H04L 5/001 |
| 2018/0262313 A1* | 9/2018 | Nam | ................. | H04W 72/0446 |
| 2018/0279145 A1* | 9/2018 | Jung | ..................... | H04L 5/0051 |
| 2018/0324678 A1* | 11/2018 | Chen | ..................... | H04W 48/16 |
| 2018/0337757 A1* | 11/2018 | Noh | ....................... | H04L 5/0064 |

(Continued)

OTHER PUBLICATIONS

Extended European Search Report issued in counterpart European Patent Application No. 18917921.1, mailed on Nov. 23, 2021 (8 pages).

(Continued)

*Primary Examiner* — Yee F Lam
(74) *Attorney, Agent, or Firm* — Osha Bergman Watanabe & Burton LLP

(57) ABSTRACT

A user terminal according to an aspect of the present disclosure includes a receiving section that receives a channel state information-reference signal (CSI-RS), and a control section that determines whether to control transmission and reception of data at timing to measure the CSI-RS based on whether the control section is able to assume a synchronous environment. According to the aspect of the present disclosure, even when a measurement other than SSB measurement is performed, it is possible to appropriately control transmission and reception of data simultaneously with the measurement.

8 Claims, 10 Drawing Sheets

(56) References Cited

U.S. PATENT DOCUMENTS

| | | | | |
|---|---|---|---|---|
| 2018/0368088 A1* | 12/2018 | Nagaraja | ........... | H04W 72/0446 |
| 2019/0222327 A1* | 7/2019 | Lin | ................... | H04W 72/0446 |
| 2019/0254110 A1* | 8/2019 | He | ...................... | H04L 41/0896 |
| 2021/0167920 A1* | 6/2021 | Cha | ....................... | H04L 5/0048 |

OTHER PUBLICATIONS

Huawei, HiSilicon; "Consideration on UE complexity to support CSI-RS RRM"; 3GPP TSG-RAN WG4 Meeting #86bis, R4-1804814; Melbourne, Australia; Apr. 16-20, 2018 (3 pages).
3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).
International Search Report for corresponding International Application No. PCT/JP2018/018230, mailed Jul. 24, 2018 (3 pages).
Written Opinion for corresponding International Application No. PCT/JP2018/018230, mailed Jul. 24, 2018 (3 pages).
Office Action in the counterpart Chinese Application No. 201880095349.4, mailed Jun. 19, 2023 (12 pages).

* cited by examiner

USER TERMINAL

TECHNICAL FIELD

The present disclosure relates to a user terminal in a next generation mobile communication system.

BACKGROUND ART

In UMTS (Universal Mobile Telecommunications System) networks, Long Term Evolution (LTE) was specified for purposes of higher data rates, lower latency, and the like (Non Patent Literature 1). In addition, LTE-A (LTE-Advanced, LTE Rel. 10, 11, 12, and 13) was specified for purposes of, for example, larger capacity and more sophisticated one as compared to LTE (LTE Rel. 8 and 9).

Successor systems of LTE (for example, FRA (Future Radio Access), 5G (5th generation mobile communication system), 5G+ (plus), NR (New Radio), NX (New radio access), and FX (Future generation radio access), and also referred to as LTE Rel. 14 or 15 or later and the like) have also been studied.

In an existing LTE system (for example, LTE Rel. 8 to 13), a user terminal (UE: user equipment) detects a synchronization signal (SS) to make synchronization with a network (for example, a base station (eNB: eNodeB)) and identifies a cell to be connected (identifies a cell by using, for example, a cell ID (identifier)). Such a process is also called cell search. A synchronization signal includes, for example, a PSS (primary synchronization signal) and/or an SSS (secondary synchronization signal).

The UE acquires configuration information (which may also be referred to as system information or the like) for communicating with a network by receiving broadcast information (for example, a master information block (MIB), a system information block (SIB), or the like).

An MIB may be transmitted via a broadcast channel (PBCH: physical broadcast channel). An SIB may be transmitted via a downlink (DL) shared channel (PDSCH: physical downlink shared channel).

CITATION LIST

Non Patent Literature

NPL 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

In a future wireless communication system (hereinafter, also simply referred to as NR), a measurement using a synchronization signal block (SSB) is used. An SSB-based measurement timing configuration (SMTC) is provided to UE. The UE performs a measurement (which may also be referred to as SSB measurement) based on an SSB to be measured in a configured SMTC window.

In the NR, operations for transmitting and receiving data at the same timing with SSB measurement have been studied. It has been studied to, for example, allow an assumption that there is no scheduling restrictions on data with the same SCS in a period in which a measurement of an SSB having a certain numerology is performed in a specific frequency band.

However, operations for transmitting and receiving data in the case where a measurement other than SSB measurement (such as a measurement based on a channel state information-reference signal (CSI-RS)) is performed have not been studied. If operations for transmitting and receiving data in the case where a measurement other than SSB measurement is performed are not appropriately defined, there is an inconvenience that communication throughput decreases.

It is an object of the present disclosure to provide a user terminal that is capable of, even when a measurement other than SSB measurement is performed, appropriately controlling the transmission and reception of data simultaneously with the measurement.

Solution to Problem

A user terminal according to an aspect of the present disclosure includes a receiving section that receives a channel state information-reference signal (CSI-RS), and a control section that determines whether to control transmission and reception of data at timing to measure the CSI-RS based on whether the control section is able to assume a synchronous environment.

Advantageous Effects of Invention

According to the aspect of the present disclosure, even when a measurement other than SSB measurement is performed, it is possible to appropriately control transmission and reception of data simultaneously with the measurement.

DESCRIPTION OF EMBODIMENTS (SSB Measurement)

Figure 1:
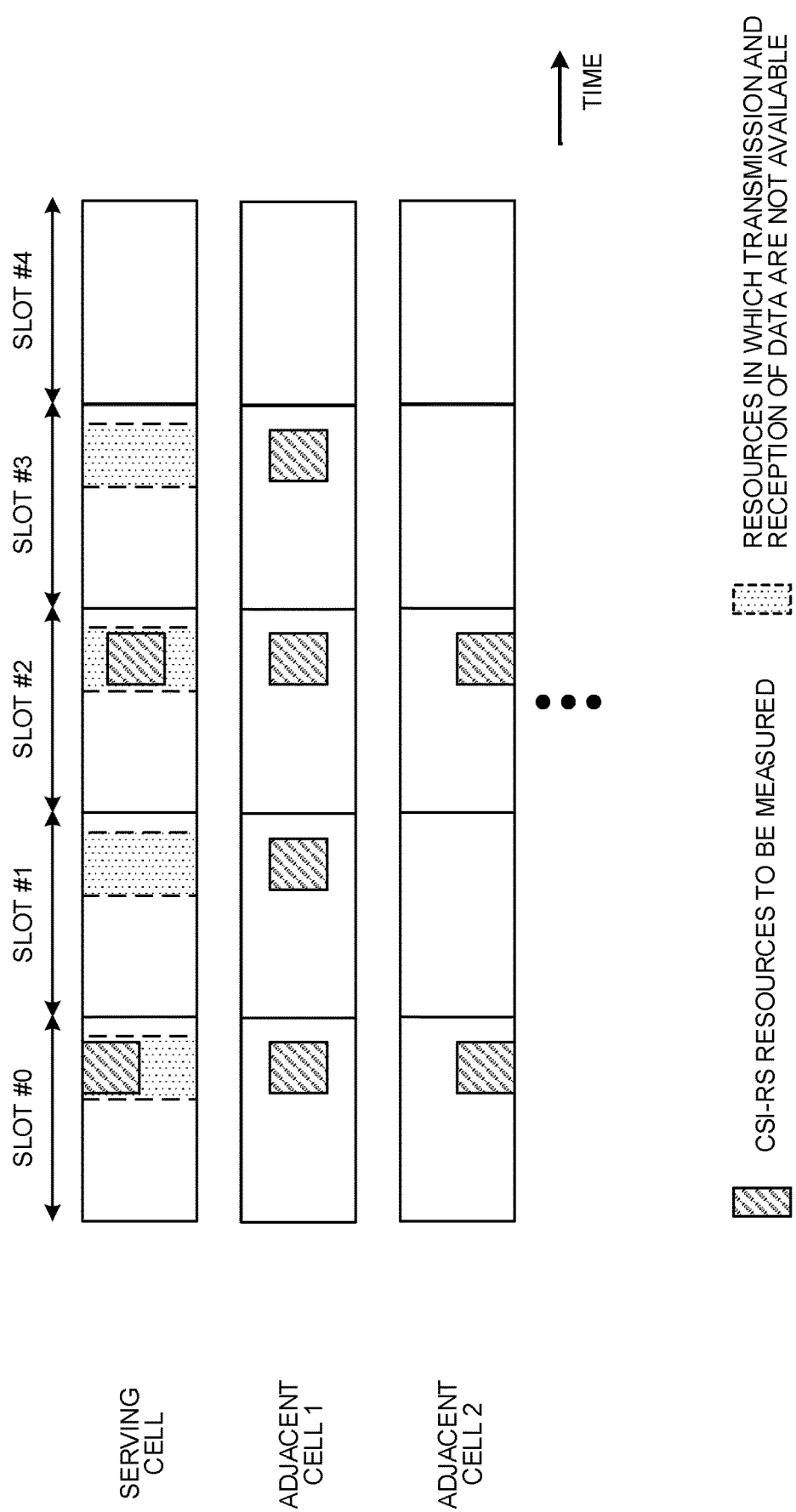
FIG. 1 is a diagram showing an example of scheduling restrictions in a case where it is possible to assume a synchronous environment.

In an existing LTE system, a UE supports different-frequency measurement (inter-frequency measurement) that is a measurement that is performed in a non-serving carrier different from a connected serving carrier.

The UE switches (retunes) the frequency (RF: radio frequency) to use from a serving carrier to a non-serving carrier in a measurement gap (MG), performs a measurement by using a reference signal or the like, and then switches the frequency to use from the non-serving carrier to the serving carrier.

An MG is a period for performing different-frequency measurement. The UE stops transmission and reception in a carrier being used for communication and performs a measurement in a carrier having another frequency in the period.

In LTE, while a different-frequency carrier is measured by using an MG, RF is switched, so it is not possible to perform transmission and reception in a serving cell. On the other hand, in other cases (for example, same-frequency measurement), there are no constraints of transmission and reception on measurement.

In NR, the following measurements have been studied:
(1) Intra-frequency measurement without MG;
(2) Intra-frequency measurement with MG; and
(3) Inter-frequency measurement.

Intra-frequency measurement without MG in (1) is also called same-frequency measurement without requirements of RF retuning. Intra-frequency measurement with MG in (2) is also called same-frequency measurement with requirements of RF retuning. When, for example, a signal to be measured is not included in the band of active BWP (bandwidth part), RF retuning is also required in same-frequency measurement, so the measurement of (2) is used.

A BWP corresponds to one or more partial frequency bands in a component carrier (CC) that is configured in NR. A BWP may also be referred to as partial frequency band, partial band, or the like.

Inter-frequency measurement in (3) is also referred to as different-frequency measurement. It is assumed to use an MG for the different-frequency measurement. However, when a UE reports a UE capability for gap less measurement to a base station (which may also be referred to as, for example, BS (base station), transmission/reception point (TRP), eNB (eNodeB), gNB (NR NodeB), or the like), different-frequency measurement without MG is possible.

The UE may perform inter-frequency measurement of a serving cell in a carrier or may perform at least one of intra-frequency measurement and inter-frequency measurement of an adjacent cell (which may also be referred to as neighbour cell). In NR, while a same-frequency carrier or a different-frequency carrier is measured by using an MG, RF is switched, so it is not possible to perform transmission and reception in a serving cell.

In LTE, NR, or the like, for same-frequency measurement and/or different-frequency measurement, at least one of a reference signal received power (RSRP), a received signal strength indicator (RSSI) and a reference signal received quality (RSRQ) of a non-serving carrier, and an SINR (signal to interference plus noise ratio) may be measured.

An RSRP is a received power of a desired signal and is measured by using at least one of, for example, a cell-specific reference signal (CRS), a channel state information-reference signal (CSI-RS), and the like. An RSSI is a total received power including a received power of a desired signal and an interference plus noise power. An RSRQ is the ratio of an RSRP to an RSSI.

The desired signal may be a signal included in a synchronization signal block (SSB). An SSB is a signal block including a synchronization signal (SS) and a broadcast channel (which may also be referred to broadcast signal, PBCH, NR-PBCH, or the like) and may be referred to as SS/PBCH block or the like.

An SS included in an SSB may include a primary synchronization signal (PSS), a secondary synchronization signal (SSS), and the like. An SSB is composed of one or more symbols (for example, OFDM symbols). Within an SSB, a PSS, an SSS, and a PBCH may be respectively arranged in different sets of one or more symbols. For example, an SSB may be composed of four or five symbols in total, including one-symbol PSS, one-symbol SSS, and two or three-symbol PBCH.

A measurement that is performed by using an SS (or an SSB) may be referred to as SS (or SSB) measurement. For example, SS-RSRP measurement, SS-RSRQ measurement, SS-SINR measurement, or the like may be performed as SS (or SSB) measurement. A demodulation reference signal (DMRS) or the like for a PSS, an SSS, and a PBCH may be used for SS (or SSB) measurement.

A UE may perform communications (transmission and reception, measurement, and the like of signals) by using at least one frequency band (carrier frequency) of frequency range 1 (FR1) and frequency range 2 (FR2).

For example, FR1 may be a frequency band lower than or equal to 6 GHz (sub-6 GHz), and FR2 may be a frequency band higher than 24 GHz (above-24 GHz). FR1 may be defined as a frequency range in which at least one of 15 kHz, 30 kHz, and 60 kHz is used as a sub-carrier spacing (SCS), and FR2 may be defined as a frequency range in which at least one of 60 kHz and 120 kHz is used as an SCS. The frequency bands, definitions, and the like of FR1 and FR2 are not limited thereto, and, for example, FR1 may be a frequency band higher than FR2.

FR2 may be used for only a time division duplex (TDD) band. FR2 is preferably used synchronization operation among multiple base stations. When multiple carriers are included in FR2, these carriers are preferably operated synchronously.

A UE may be provided with (configured with) information on same-frequency measurement and/or different-frequency measurement (for example, "MeasObjectNR" information element) from a base station by using, for example, upper layer signaling, physical layer signaling, or a combination of them.

Upper layer signaling may be any one of, for example, RRC (radio resource control) signaling, MAC (medium access control) signaling, broadcast information, and the like or any combination of them.

MAC signaling may use, for example, a MAC control element (MAC CE), a MAC PDU (protocol data unit), or the like. Broadcast information may be, for example, a master information block (MIB), a system information block (SIB), remaining minimum system information (RMSI), or the like.

Information on same-frequency measurement and/or different-frequency measurement may include information applicable to same-frequency measurement, different-frequency measurement, or the like using an SSB and/or a CSI-RS. Information on same-frequency measurement and/or different-frequency measurement may include, for example, a frequency band (carrier) to be measured, the presence or absence of synchronization of a carrier to be measured, the resource location (slot number, symbol number, RB index, or the like) of a signal to be measured (DMRS, CSI-RS, or the like), an SSB-based measurement timing configuration (SMTC), the index of an SSB to be measured, and the like. An SSB index may be associated with the resource location of an SSB.

The presence or absence of synchronization of a carrier to be measured may be configured in a UE by, for example, RRC signaling by using information on whether a carrier to be measured is synchronized with a serving cell (whether the index of an SSB to be transmitted by a neighbour cell can be derived based on the timing of the serving cell) (which may be referred to as parameter "useServingCellTimingForSync"). The information may be referred to as information on SSB index derivation, information on carrier (or cell) synchronization, or the like.

When information on same-frequency measurement and/or different-frequency measurement (for example, "MeasObjectNR" information element) includes useServingCellTimingForSync, it may be assumed that useServingCellTimingForSync is enabled. When useServingCellTimingForSync is not included, it may be assumed that useServingCellTimingForSync is disabled.

When multiple carriers (or multiple cells) are synchronized, a UE may assume that radio frame boundaries (or frame timings) match among these carriers or cells or may assume that system frame numbers (SFN) match or may assume both of them.

The location of an SSB to be measured within an SMTC period may be provided by a bitmap (which may be referred to as parameter "ssb-ToMeasure"). The bitmap may be associated with a frequency band to be measured. For example, the SSB index may be provided by using a longer bitmap as a frequency band to be measured becomes higher.

An SMTC may include the length, cycle, timing offset, and the like of an SSB measurement period (which may be referred to as SMTC window, measurement timing, or the like). A UE performs a measurement based on an SSB to be measured within a configured SMTC window.

UE capability signaling for configuring an MG for different-frequency measurement may be supported. For example, an MG for different-frequency measurement of each of FR1 and FR2 may be separately configured as the UE capability signaling.

For example, a UE may provide capability signaling including an MG length or duration, an MG cycle period, or the like for a gap corresponding to at least one of FR1 alone, FR2 alone, and UE alone.

(SSB Measurement and Transmission and Reception of Data)

In NR, to enable flexible control, it has also been studied to transmit and receive data in a symbol in which an SSB is configured. When the numerology of an SSB differs from the numerology of data and/or control channel of a serving cell, whether a UE is able to simultaneously perform a process (including at least one of simultaneous transmission, simultaneous reception, simultaneous transmission and reception, and the like) on these signals having different numerologies may depend on UE capability. For example, it is assumed that a UE that has no such simultaneous processing capabilities is not able to transmit or receive data during SSB measurement.

A numerology corresponds to, for example, an SCS. In the present disclosure, a numerology and an SCS may be read interchangeably. In the present disclosure, the term "data" may be read as at least one of data, control channel, and reference signal. For example, "data" may be read as PUCCH/PUSCH or may be read as PDCCH/PDSCH. Transmission and reception of data may mean at least one of transmission of PUCCH/PUSCH and reception of PDCCH/PDSCH in a serving cell.

A UE may support simultaneous transmission and reception of data and SSB with different numerologies, and information that the UE has such a capability may be reported to a base station by UE capability information (simultaneousRxDataSSB-DiffNumerology). A UE having such a capability may simultaneously perform reception of an SSB and at least one of reception and transmission of data. The above capability may be read as a capability on intra-carrier concurrent measurement (intraCarrierConcurrentMeas). The name such as simultaneousRxDataSSB-DiffNumerology is not limited thereto.

In FR1, regardless of a synchronous environment or an asynchronous environment, when an SSB with an SCS is measured, it may be assumed that there are no scheduling restrictions on data with the same SCS. In other words, when an SCS is the same between an SSB and data, a UE may transmit or receive the data during the SSB measurement.

In FR1, when an SSB with an SCS is measured, data with a different SCS may be restricted. FR1 may be a band of both frequency division duplex (FDD) and a band of TDD, so both synchronous and asynchronous cases are considered. For example, a UE that is not capable of simultaneously processing an SSB and data with different SCSs may comply with at least one of the following scheduling restrictions for cases where an SSB in FR1 is measured.

(1) When an NW (or a carrier to be measured) is synchronized (for example, useServingCellTimingForSync is enabled), the UE is not expected to transmit or receive data (or is not able to transmit or receive data) with an SCS different from the SCS of an SSB in an SSB symbol to be measured within an SMTC window and one symbol before and/or behind the SSB symbol among successive SSB symbols.

(2) When an NW (or a carrier to be measured) is not synchronized (for example, when useServingCellTimingForSync is disabled), a UE is not expected to transmit or receive data (or is not able to transmit or receive data) with an SCS different from the SCS of an SSB in all the symbols within an SMTC window.

The phrase "is not expected to transmit or receive" may be read as "disables transmission and reception", "does not perform transmission and reception", "restricts transmission and reception", "is expected not to be able to transmit or receive", or the like. A state in which an NW or a carrier to be measured is synchronized (or not synchronized) and a state in which a UE is able to (not able to) assume a synchronous environment may be read interchangeably. When a symbol can be used for transmission and reception of data, a symbol may be referred to as data symbol.

The above (1) is because, in consideration of the fact that an SSB of a neighbour cell comes to a UE with a deviation of propagation delay difference, an SSB symbol and one symbol before and/or behind the SSB symbol are assumed as time resources that are likely to receive influence from SSB measurement in a synchronous environment. The above-(2) is because, since it is not possible to predict which symbol within an SMTC window receives an SSB in an asynchronous environment, all the symbols within the window are assumed as time resources that are likely to receive influence from SSB measurement.

When intra-band CA is performed in FR1, scheduling restrictions may be applied to all the serving cells in the band regardless of synchronous/asynchronous environment, SCS, or the like. For example, when two CCs are subjected to intra-band CA in FR1, it may be assumed that, when SSB measurement is performed for one of the CCs, transmission and reception of data of the other one of the CCs receives the influence of scheduling restrictions. When inter-band CA is performed in FR1, it may be assumed that there are no scheduling restrictions regardless of synchronous/asynchronous environment, SCS, or the like.

CA may be read as other words and may be read as, for example, dual connectivity (DC) or the like.

Since FR2 is a TDD band, it is sufficient to consider the case of a synchronous environment. In FR2, a UE is expected to perform receiving BF using analog BF (beam forming) in performing SSB measurement. In this case, when the UE directs a beam toward a neighbour cell in order to perform SSB measurement on the neighbour cell, it may be assumed that the UE is not able to simultaneously receive data from a serving cell. Therefore, the UE may be assumed not to be able to transmit or receive data during SSB measurement in FR2 regardless of a UE capability and an SCS.

For example, for cases where SSB measurement is performed in FR2, it may comply with the following scheduling restrictions: a UE is not expected to transmit or receive data (is not able to transmit or receive data) in an SSB symbol to be measured and one symbol before and/or behind the SSB symbol among the successive SSB symbols within an SMTC window. During SS-RSRQ measurement, the "SSB symbol" may be read as "SSB symbol and RSSI measurement symbol".

When intra-band CA is performed in FR2, scheduling restrictions may be applied to all the serving cells in the band. When inter-band CA is performed in FR2, scheduling restrictions may be applied to all the serving cells of the bands (of both bands).

When inter-band CA is performed in FR1 and FR2, it may be assumed that there are no scheduling restrictions.

Operations for transmitting and receiving data on a serving cell during CA may be determined in consideration of measurement timing information (for example, SMTC, SSB index, or the like) in other serving cells. At the time of intra-band CA, information on whether to allow same-frequency measurement in SCell (secondary cell) frequency may be provided to a UE. The UE may control the execution of same-frequency measurement in the SCell frequency based on the information.

Incidentally, a UE may perform channel state information-reference signal (CSI-RS)-based same-frequency measurement and/or different-frequency measurement.

A UE may perform a measurement for radio link monitoring (RLM) (which may be referred to as RLM measurement). When a radio link failure (RLF) is detected by RLM, re-establishment of RRC connection may be performed. A reference signal for RLM (RLM-RS) may be at least one of an SSB, a CSI-RS, a PSS, an SSS, a DMRS, a mobility reference signal (MRS: mobility RS), a beam specific signal, and the like, or a signal composed by extending, modifying, or performing other operations on any one of them.

A UE may also perform a measurement for L1-RSRP (reference signal received power (RSRP) in a physical layer). A reference signal for L1-RSRP may be at least one of an SSB, a CSI-RS, a PSS, an SSS, a DMRS, an MRS, a beam specific signal, and the like or a signal composed by extending, modifying, or performing other operations on any one of them.

A UE may also perform a measurement for beam failure detection. A reference signal for beam failure detection may be at least one of an SSB, a CSI-RS, a PSS, an SSS, a DMRS, an MRS, a beam specific signal, and the like or a signal composed by extending, modifying, or performing other operations on any one of them.

An L1-RSRP measurement and a measurement for beam failure detection are measurements of a physical layer, so these measurements may be referred to as L1 measurements (Layer 1 measurements). A reference signal for L1-RSRP and a reference signal for beam failure detection may be referred to as reference signal for L1 measurement (L1-RS).

Operations for transmitting and receiving data, which have been studied in NR so far, are operations for transmitting and receiving data in the case where SSB-based same-frequency measurement and/or different-frequency measurement (SSB measurement) is being performed as described above. However, operations for transmitting and receiving data in the case where CSI-RS-based same-frequency measurement and/or different-frequency measurement (CSI-RS measurement), RLM measurement, and L1 measurement are being performed have not been studied.

For example, when the SCS of RLM-RS (or L1-RS) is different from the SCS of data, it has not been studied whether it is possible to simultaneously transmit and receive these signal and data. In addition, it has not been studied whether analog BF for data reception is the same as analog BF for RLM (or L1-RSRP) in FR2.

If operations for transmitting and receiving data in the case where CSI-RS measurement, RLM measurement, and L1 measurement are being performed are not appropriately defined, there is an inconvenience that communication throughput decreases.

The inventors conceived of UE operations in the case where CSI-RS measurement, RLM measurement, and L1 measurement are being performed.

Hereinafter, embodiments according to the present disclosure will be described in detail with reference to the drawings. Wireless communication methods according to the embodiments each may be applied solely or may be applied in combination.

In the following embodiments, "one symbol before and/or behind" may be read as "a certain number of symbols at least before or behind (temporally)" or "a first number of symbols before and a second number of symbols behind (temporally)". A certain number, a first number, and a second number each may be, for example, one, two, or three symbols or the like. A first number and a second number may be not the same.

Wireless Communication Method

First Embodiment

A first embodiment relates to transmission and reception of data during CSI-RS measurement.

In FR1, regardless of a synchronous environment or an asynchronous environment, when a CSI-RS with an SCS is measured, it may be assumed that there are no scheduling restrictions on data with the same SCS. In other words, when the SCS of a CSI-RS is the same as the SCS of data, a UE may transmit or receive the data during a measurement of the CSI-RS.

A UE may support simultaneous transmission and reception of data and a CSI-RS with different numerologies, and information that the UE has such a capability may be reported to a base station by UE capability information. When the UE supports a capability of simultaneous transmission and reception of data and an SSB with different numerologies (for example, simultaneousRxDataSSB-DiffNumerology), the UE may be expected to support simultaneous transmission and reception of data and a CSI-RS with different numerologies.

A UE may support a capability of simultaneous transmission and reception of data and a CSI-RS with different numerologies as a capability different from the capability of simultaneous transmission and reception of data and an SSB with different numerologies (for example, simultaneousRx-DataSSB-DiffNumerology). In other words, UE capability information indicating the capability of simultaneous transmission and reception of data and a CSI-RS with different numerologies may be defined separately from UE capability information indicating the capability of simultaneous transmission and reception of data and an SSB with different numerologies.

A UE having a capability of simultaneous transmission and reception of a CSI-RS and data with different SCSs may assume that there are no scheduling restrictions on data. In other words, when the SCS of a CSI-RS is different from the SCS of data, the UE may receive the data during a measurement of the CSI-RS.

A UE having no capability of simultaneous transmission and reception of a CSI-RS and data with different SCSs may be compliant with the following scheduling restrictions: The UE is not expected to transmit or receive data with an SCS different from the SCS of the CSI-RS (or is not able to transmit or receive data) during CSI-RS measurement. Operations in a synchronous environment and an asynchronous environment will be described later.

A capability of simultaneous transmission and reception of data and a CSI-RS with different numerologies does not need to be defined. In this case, (all the) UEs may be expected to be able to or may be expected not to be able to simultaneously transmit and receive a CSI-RS and data with different SCSs. The expectation may be defined in specifications.

In FR2, in the case of CSI-RS measurement as well, it is assumed to direct reception beam toward a neighbour cell as in the case of SSB measurement. For this reason, for cases to perform CSI-RS measurement in FR2, a UE is not expected to transmit or receive data (or is not able to transmit or receive data) in a CSI-RS symbol to be measured and one symbol before and/or behind the CSI-RS symbol.

When intra-band CA is performed in FR2, scheduling restrictions may be applied to all the serving cells in the band. When inter-band CA is performed in FR2, scheduling restrictions may be applied to all the serving cells of the bands (of both bands). In other words, when intra-band CA or inter-band CA is performed in FR2, it may be not assumed to transmit or receive data in a CSI-RS symbol and one symbol before and/or behind the CSI-RS symbol in all the serving cells.

<Synchronous Environment>

When a UE is able to assume a synchronous environment in FR1, the UE does not need to be expected to transmit or receive data with an SCS different from the SCS of the CSI-RS in a CSI-RS symbol and one symbol before and/or behind the CSI-RS symbol.

When intra-band CA is performed in FR1 and a UE is able to assume a synchronous environment in the FR1, the UE may assume that scheduling restrictions are applied to all the serving cells of the band.

When inter-band CA is performed in FR1 and a UE is able to assume a synchronous environment in the FR1, the UE may assume that there are no scheduling restrictions or may assume that scheduling restrictions are applied to all the serving cells of the bands.

A UE may assume a synchronous environment except that associated SSBs are configured for all the CSI-RSs to be measured. In other words, when there is at least one CSI-RS for which no associated SSB is configured among configured CSI-RSs, a UE may assume a synchronous environment. When associated SSBs are configured for all the configured CSI-RSs, a UE may assume an asynchronous environment.

A UE may configure one associated SSB per one piece of CSI-RS resources. The associated SSB may be or does not need to be in quasi-co-location (QCL) relation with the CSI-RS resources.

A UE may determine whether the UE is able to assume a synchronous environment in CSI-RS measurement, based on the above associated information other than an SSB (for example, useServingCellTimingForSync, other information elements, parameters, and the like). For example, a UE may assume a synchronous environment when useServingCellTimingForSync is enabled. When, for example, a frequency to be measured falls within a TDD band, a UE may assume a synchronous environment.

Figure 2:
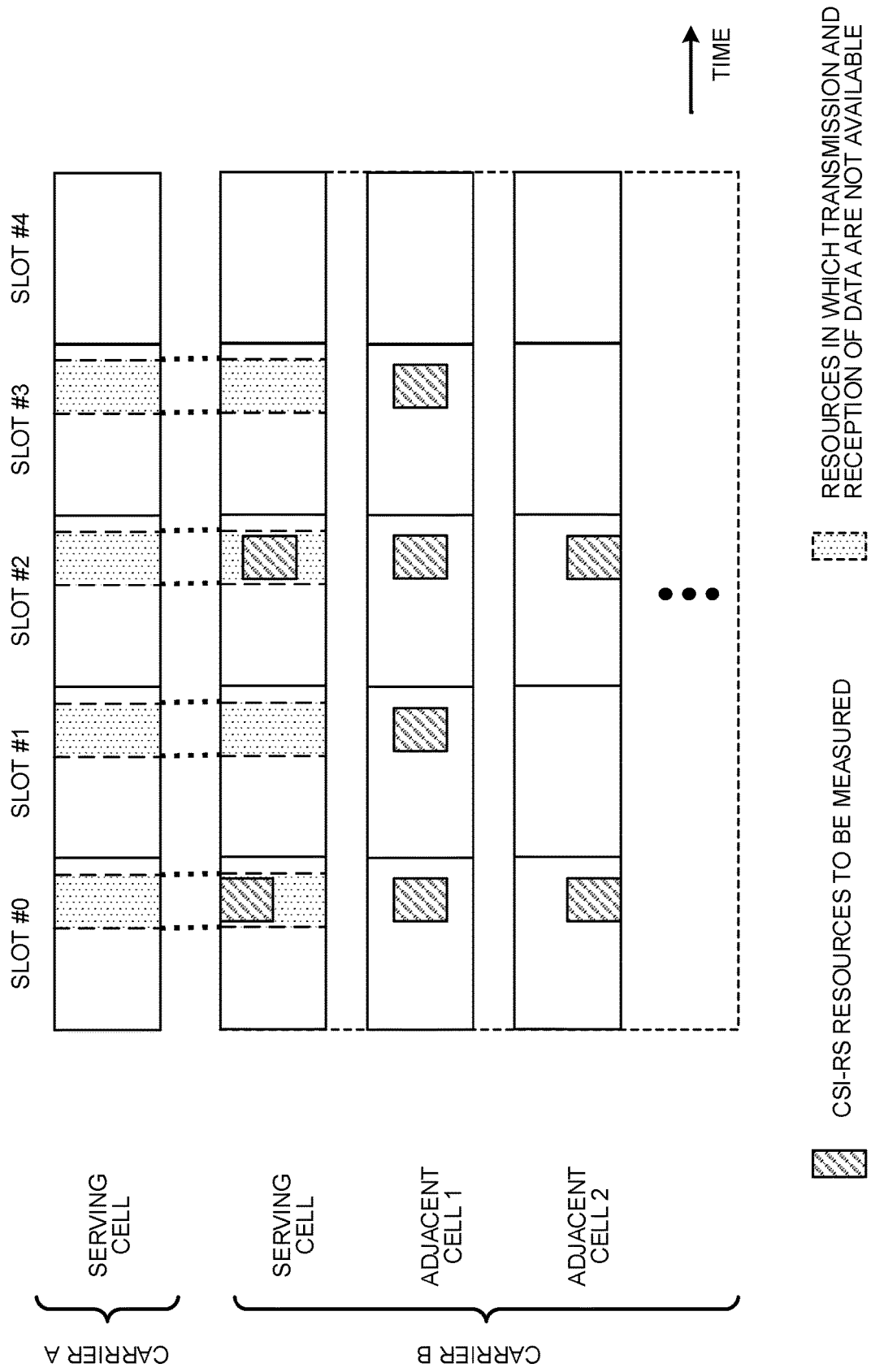
FIG. 2 is a diagram showing another example of scheduling restrictions in a case where it is possible to assume a synchronous environment.

FIG. 1 is a diagram showing an example of scheduling restrictions in a case where it is possible to assume a synchronous environment. FIG. 2 is a diagram showing another example of scheduling restrictions in a case where it is possible to assume a synchronous environment. FIG. 1 corresponds to the case where a UE is not configured with CA (a UE is configured with one serving cell). FIG. 2 corresponds to the case where a UE is configured with CA (a UE is configured with two serving cells).

In FIG. 1, CSI-RSs to be measured are transmitted by carriers to be measured (serving cell, adjacent cell 1, and adjacent cell 2). In the serving cell and the adjacent cell 2, CSI-RS resources are in slot #0 and slot #3. In the adjacent cell 1, CSI-RS resources are in slots #0 to #3. The UE is configured to perform a measurement using these CSI-RSs. These cells are synchronized.

When it is possible to assume a synchronous environment as in the case of FIG. 1, the UE does not need to be expected to transmit or receive data with an SCS different from the SCS of the CSI-RS in a configured CSI-RS symbol and one symbol before and/or behind the CSI-RS symbol. In the drawing, "resources in which transmission and reception of data are not available" correspond to resources on which a UE assumes that there are scheduling restrictions on data. The UE may assume that there are no scheduling restrictions on the other resources.

In FIG. 2, CSI-RSs to be measured are transmitted by a carrier B. The configurations of CSI-RSs of a serving cell, adjacent cell 1, and adjacent cell 2 of the carrier B are similar to those of FIG. 1. A carrier A and the carrier B are synchronized.

When it is possible to assume a synchronous environment as in the case of FIG. 2, the UE does not need to be expected to transmit or receive data with an SCS different from the SCS of the CSI-RS in a CSI-RS symbol to be measured in a carrier (carrier B) and one symbol before and/or behind the CSI-RS symbol not only by the same carrier (carrier B) but also by another carrier (carrier A).

FIG. 1 and FIG. 2 show examples in which the symbol locations of CSI-RS resources in each cell are the same (aligned); however, the configuration is not limited thereto. The configuration of slots, the number of CSI-RSs, and the like are not limited to these examples. The UE does not need to be expected to transmit or receive data with an SCS different from the SCS of a CSI-RS in a CSI-RS symbol in at least one cell in which CSI-RS measurement is configured and one symbol before and/or behind the CSI-RS symbol.

<Asynchronous Environment>

When a UE is not able to assume a synchronous environment in FR1, the UE may measure a CSI-RS with an SCS different from the SCS of data in a serving cell within a measurement gap (MG). In addition, the UE does not need to be expected to transmit or receive (is not able to transmit or receive) data in the serving cell within the MG.

In this case, the UE may perform a measurement by using CSI-RS resources included within an MG period and does not need to perform a measurement in CSI-RS resources outside the MG period. The UE may, outside the MG period, transmit and receive data with an SCS different from the SCS of a CSI-RS to be measured within the MG period.

When the UE is not able to assume a synchronous environment in FR1, the UE may measure a CSI-RS within a configured certain period and does not need to be expected to transmit or receive data with an SCS different from the SCS of the CSI-RS within the certain period. The certain period may be configured in the UE by, for example, upper layer signaling. The UE does not need to be expected to transmit or receive data with an SCS same as the SCS of the CSI-RS within the certain period.

The certain period may be an SMTC window. In other words, even when the UE is not configured with SSB measurement and is configured with CSI-RS measurement, an SMTC window may be configured in the UE. In this case, the UE may perform CSI-RS measurement by using CSI-RSs included in the SMTC window. The UE does not need to measure CSI-RS resources outside the SMTC window.

The certain period may be a window for CSI-RS measurement. The window may be a window that is defined separately from an SMTC window. When a window for CSI-RS measurement is configured in the UE by using, for example, upper layer signaling, the UE may perform CSI-RS measurement by using CSI-RSs included in the window. The UE does not need to measure CSI-RS resources outside the window.

The certain period may be definitely configured in the UE when the UE is configured with a CSI-RS in which an associated SSB is configured.

Figure 3:
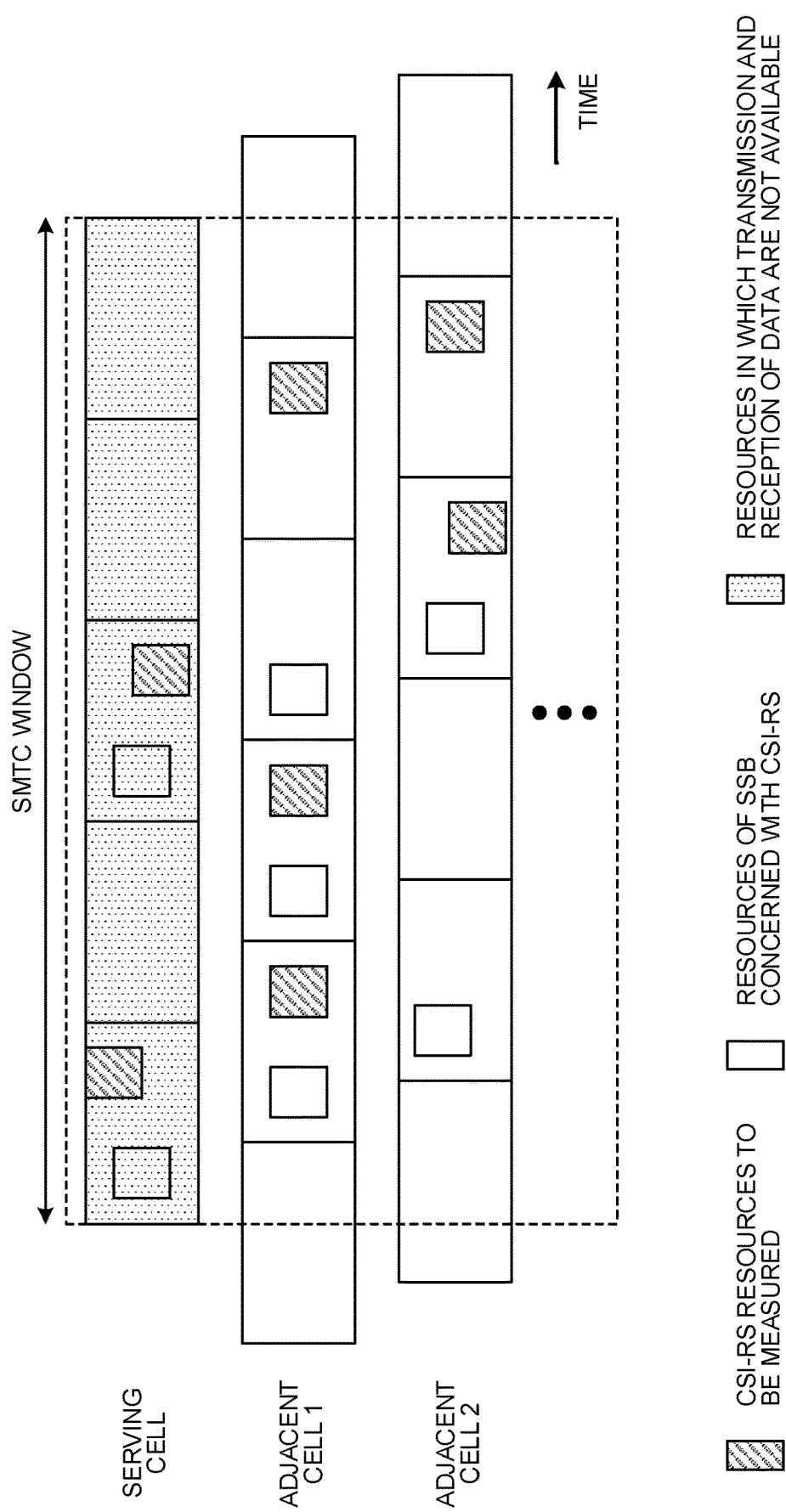
FIG. 3 is a diagram showing an example of scheduling restrictions in a case where it is not possible to assume a synchronous environment.
Figure 4:
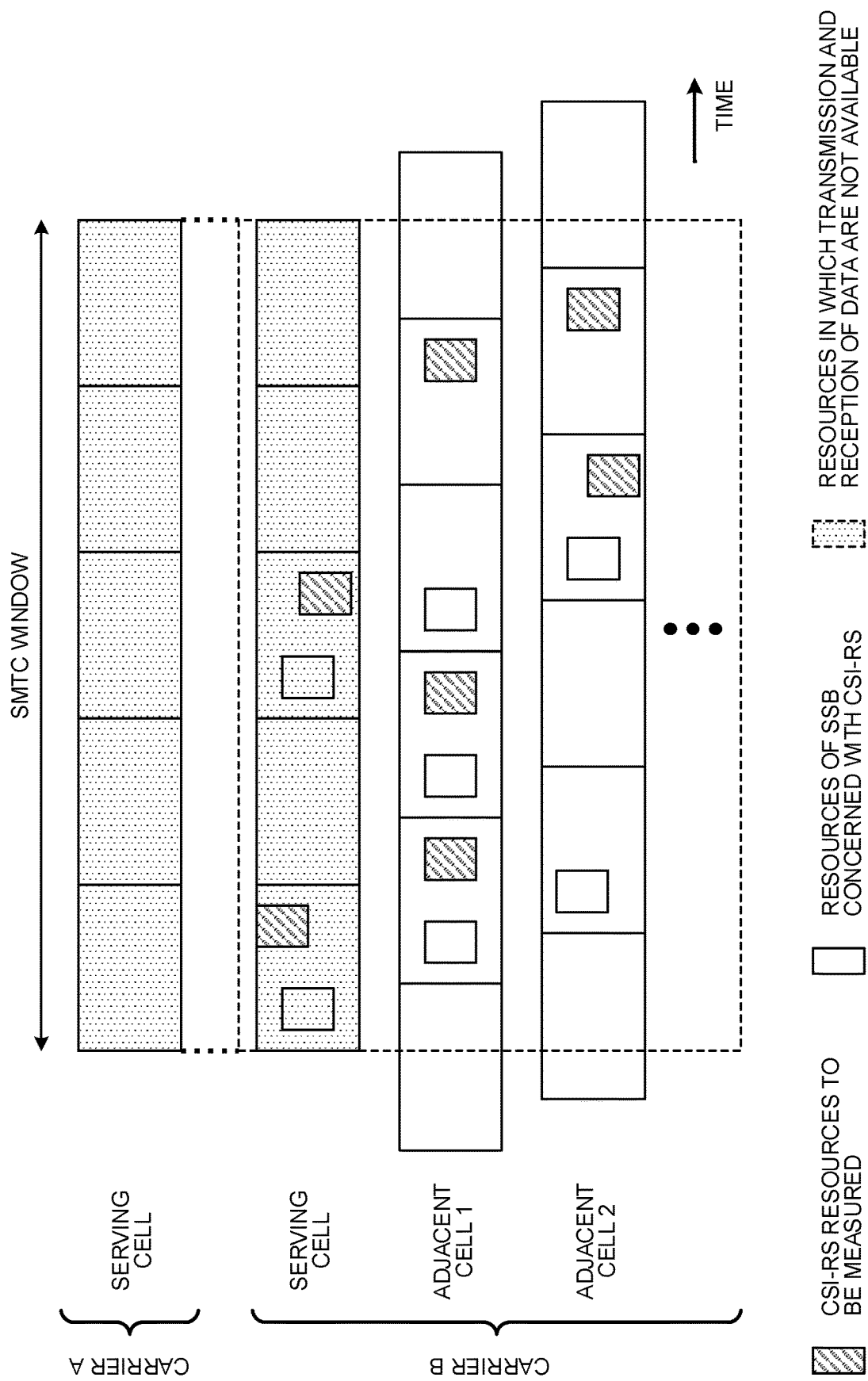
FIG. 4 is a diagram showing another example of scheduling restrictions in a case where it is not possible to assume a synchronous environment.

FIG. 3 is a diagram showing an example of scheduling restrictions in a case where it is not possible to assume a synchronous environment. FIG. 4 is a diagram showing another example of scheduling restrictions in a case where it is not possible to assume a synchronous environment. FIG. 3 corresponds to the case where a UE is not configured with CA (a UE is configured with one serving cell). FIG. 4 corresponds to the case where a UE is configured with CA (a UE is configured with two serving cells).

In FIG. 3, CSI-RSs to be measured are transmitted by carriers to be measured (serving cell, adjacent cell 1, and adjacent cell 2). The UE is configured to perform a measurement using these CSI-RSs. These cells are asynchronous.

FIG. 3 and FIG. 4 correspond to the above-described case where CSI-RSs are measured within a configured SMTC window and a UE is not expected to transmit or receive data with an SCS different from the SCS of the CSI-RSs within the SMTC window. FIG. 3 and FIG. 4 also show resources of an SSB associated with each CSI-RS. A CSI-RS and an SSB associated with the CSI-RS may be included in the same slot or may be respectively included in slots different from each other.

When it is not possible to assume a synchronous state as shown in FIG. 3, any symbol may be used for CSI-RS measurement within a window period, so the UE does not need to be expected to transmit or receive data within the window period.

In FIG. 4, CSI-RSs to be measured are transmitted by a carrier B. The configurations of CSI-RSs of a serving cell, adjacent cell 1, and adjacent cell 2 of the carrier B are similar to those of FIG. 1. This example shows an example in which the frame timing of the serving cell of the carrier A and the frame timing of the serving cell of the carrier B are aligned; however, the frame timings may be not aligned.

When it is not possible to assume a synchronous environment as shown in FIG. 4, any symbol may be used for CSI-RS measurement within the window period configured in a carrier (carrier B), so the UE does not need to be expected to transmit or receive data within the window period.

According to the above-described first embodiment, a UE is able to appropriately assume scheduling restrictions on transmission and reception of data during CSI-RS measurement.

Second Embodiment

A second embodiment relates to transmission and reception of data during RLM-RS measurement.

Initially, operations for transmitting and receiving data on an RLM reference signal (RLM-RS) symbol in PCell (primary cell)/PSCell (primary secondary cell) frequency (frequency including at least one of PCell and PSCell) will be described.

«FR1»

In FR1, when the SCS of an RLM reference signal is the same as the SCS of data, a UE may assume that there are no scheduling restrictions. In other words, when the SCS of an RLM reference signal is the same as the SCS of data, the UE may transmit and receive the data in radio link monitoring. In the present disclosure, "in radio link monitoring" may be read as "on an RLM-RS symbol", "on an RLM-RS symbol and one symbol before and/or behind the RLM-RS symbol", or the like.

On the other hand, in FR1, when the SCS of an RLM reference signal is different from the SCS of data, the UE may be compliant with, for example, the following scheduling restrictions (Alt. 1 to 3, including no scheduling restrictions).

(Alt. 1) A UE is not expected to simultaneously transmit or receive (is not able to transmit or receive) an RLM reference signal and data. When the SCS of an RLM reference signal is different from the SCS of data, a UE does not need to be expected to transmit or receive the data in radio link monitoring. Such scheduling restrictions may be applied to all the UEs that perform communications at the same PCell/PSCell frequency as the UE.

(Alt. 2) A UE may be compliant with scheduling restrictions using a UE capability.

For example, in RRM measurement based on an SSB, a capability of simultaneous transmission and reception of data and an SSB with different numerologies (simultaneousRxDataSSB-DiffNumerology) is defined. When an RLM reference signal (RLM-RS) is an SSB, the UE capability (simultaneousRxDataSSB-DiffNumerology) may be reused. A UE having the UE capability may transmit and receive data in radio link monitoring even when the SCS of an RLM reference signal is different from the SCS of data. A UE having no UE capability may be expected not to be able to simultaneously perform transmission and reception (transmit or receive the data) when the SCS of an RLM reference signal is different from the SCS of data.

When an RLM reference signal is an CSI-RS as well, the UE capability may be reused. Alternatively, even when the SCS of an RLM reference signal is different from the SCS of data, a new UE capability that exhibits a UE capability to transmit and receive data in radio link monitoring may be defined. When a UE has the new UE capability, the UE may be expected to be able to transmit and receive data in radio link monitoring even when the SCS of an RLM reference signal is different from the SCS of data.

When an RLM reference signal is a specific reference signal (for example, CSI-RS), a UE may be expected not to be able to perform simultaneous transmission and reception (transmit or receive the data) (that is, a UE does not need to support simultaneous transmission and reception of data with an SCS different from the SCS of an RLM reference signal).

(Alt. 3) A UE may assume that there are no scheduling restrictions. In other words, a UE may be expected to be able to simultaneously transmit and receive an RLM reference signal and data with different SCSs (transmit and receive the data). Such scheduling restrictions may be applied when RLM is especially handled.

«FR2»

In FR2, the following scheduling restrictions are conceivable from the viewpoint of analog BF.

In FR2, when the SCS of an RLM reference signal is the same as the SCS of data, a UE may be compliant with, for example, the following scheduling restrictions (Alt. a to c, including no scheduling restrictions). In RRM measurement based on an SSB, analog reception BF is directed toward a neighbour cell, so the UE is disabled to perform simultaneous reception.

(Alt. a) A UE, not depending on other conditions (definitely), is expected not to be able to simultaneously transmit or receive an RLM-RS and data. With this expectation, for example, as in the case of RRM measurement based on an SSB, it is possible to deal with a situation in which the same beam as a beam that transmits or receives data is not always used in RLM.

(Alt. b) A UE is expected to be able to simultaneously receive an RLM-RS and data depending on other conditions (for example, on an RLM-RS symbol that is quasi-co-location (QCL) with a PDCCH, or the like). For example, when only an RS that is QCL with an active transmission configuration indicator (TCI) state (TCI state (TCI-state)) (a beam of PDCCH) is monitored as an RLM-RS (for example, when an RLM-RS is not explicitly indicated), RLM is considered to be performed with analog BF that is used to transmit and receive data, so the UE may be expected to be able to simultaneously transmit and receive an RLM-RS and data.

A UE may control a process of receiving (for example, at least one of demapping, demodulation, and decoding) a channel (for example, PDCCH or PDSCH) based on information on the QCL of the channel (QCL information). QCL is an index indicating the statistical property of a channel. For example, when a signal and another signal are in a QCL relation, it may mean that at least one of doppler shift, doppler spread, average delay, delay spread, and spatial parameter (for example, spatial reception parameter (spatial Rx parameter)) may be assumed to be the same (at least one of them may be assumed to be QCL) between these multiple different signals.

A spatial reception parameter may be associated with a reception beam (for example, reception analog beam) of a UE, and a beam may be specified based on spatial QCL. In the present disclosure, QCL and at least one element of QCL may be read as sQCL (spatial QCL).

A TCI state may indicate (include) QCL information. A TCI state (and/or QCL information) may be, for example, information on QCL between an intended channel (or a reference signal (RS) for the channel) and another signal (for example, another downlink reference signal (DL-RS)).

(Alt. c) A UE, not depending on other conditions (definitely), is expected to be able to simultaneously transmit and receive an RLM-RS and data. In other words, the UE assumes that there are no scheduling restrictions. With this expectation, it is possible to deal with a situation in which RLM is performed only with the same beam as the beam of analog BF that is used for data.

On the other hand, in FR2, when the SCS of an RLM reference signal is different from the SCS of data, the UE may be compliant with scheduling restrictions based on any one of the above-described Alt. 1 to 3 and Alt. a to c or any combination of them. When analog BF is common between data and RLM, it influences whether it is possible to simultaneously transmit and receive data and an RLM-RS with different SCSs, so this situation is dealt with.

Alt. 1 to 3 may be scheduling restrictions other than Alt. 1 to 3 in the case of different SCSs in FR1. Alt. a to c may be scheduling restrictions other than Alt. a to c in the case of the same SCSs in FR2.

<Scheduling Restrictions on SCell in Intra-Band CA or Inter-Band CA>

Next, scheduling restrictions on SCell in intra-band CA or inter-band CA will be described.

«Intra-Band CA in FR1»

When intra-band CA is performed in FR1, a UE may be compliant with the following restrictions (scheduling restrictions) to transmit and receive data on an SCell serving cell.

(Alt. 1) A UE may be compliant with the same scheduling restrictions as those on PCell/PSCell in FR1. (Alt. 1) corresponds to scheduling restrictions during RRM measurement based on an SSB, so (Alt. 1) is compatible with SSB measurement.

(Alt. 2) A UE may assume that there are no scheduling restrictions. In other words, when intra-band CA is performed in FR1, the UE may transmit and receive data in radio link monitoring on an SCell serving cell.

«Inter-Band CA in FR1»

When inter-band CA is performed in FR1, a UE may be compliant with the following restrictions (scheduling restrictions) to transmit and receive data on an SCell serving cell.

(Alt. 1) A UE may be compliant with the same scheduling restrictions as those on PCell/PSCell in FR1.

(Alt. 2) A UE may assume that there are no scheduling restrictions. In other words, when inter-band CA is performed in FR1, the UE may transmit and receive data in radio link monitoring on an SCell serving cell. (Alt. 2) corresponds to scheduling restrictions during RRM measurement based on an SSB, so (Alt. 2) is compatible with SSB measurement.

«Intra-Band CA in FR2»

When intra-band CA is performed in FR2, a UE may be compliant with the following restrictions (scheduling restrictions) to transmit and receive data on an SCell serving cell.

(Alt. 1) A UE may be compliant with the same scheduling restrictions as those on PCell/PSCell in FR2. (Alt. 1) corresponds to scheduling restrictions during RRM measurement based on an SSB, so (Alt. 1) is compatible with SSB measurement.

(Alt. 2) A UE may assume that there are no scheduling restrictions. In other words, when intra-band CA is performed in FR2, the UE may transmit and receive data in radio link monitoring on an SCell serving cell.

«Inter-Band CA in FR2»

When inter-band CA is performed in FR2, a UE may be compliant with the following restrictions (scheduling restrictions) to transmit and receive data on an SCell serving cell.

(Alt. 1) A UE may be compliant with the same scheduling restrictions as those on PCell/PSCell in FR2. (Alt. 1) corresponds to scheduling restrictions during RRM measurement based on an SSB, so (Alt. 1) is compatible with SSB measurement.

(Alt. 2) A UE may assume that there are no scheduling restrictions. In other words, when inter-band CA is performed in FR2, the UE may transmit and receive data in radio link monitoring on an SCell serving cell.

«Inter-Band CA Between FR1 and FR2»

When inter-band CA is performed between FR1 and FR2, a UE may assume that there are no scheduling restrictions on an SCell serving cell. In other words, when inter-band CA is performed between FR1 and FR2, the UE may transmit and receive data in radio link monitoring on an SCell serving cell.

Next, some examples of scheduling restrictions in the above-described various cases will be described in more details.

<Case where RLM Reference Signal (RLM-RS) is SS Block and Case where RLM-RS is CSI-RS>

Different scheduling restrictions may be defined according to a type (kind) of an RLM reference signal (RLM-RS) (for example, between a case of SS block and a case of CSI-RS). A type of reference signal may mean which one of SSB, CSI-RS, PSS, SSS, DMRS, MRS, beam specific signal, and the like the reference signal is.

A UE may determine whether to be able to simultaneously transmit and receive an RLM-RS and data based on first scheduling restrictions when an SSB is configured as an RLM-RS and may determine whether to be able to simultaneously transmit and receive an RLM-RS and data based on second scheduling restrictions when a CSI-RS is configured as an RLM-RS.

For example, when the SCS of an RLM reference signal is different from the SCS of data and the RLM reference signal is an SS block in FR1, whether simultaneous transmission and reception is possible may be determined in accordance with whether a UE has a certain UE capability (for example, a UE capability for RRM (simultaneousRx-DataSSB-DiffNumerology or the like)).

When an RLM reference signal is a CSI-RS in FR1, it is assumed that a UE capability that defines a measurement based on a CSI-RS (a UE capability for RRM based on a CSI-RS) is not always available. For this reason, when an RLM reference signal is a CSI-RS, a UE may be expected not to be able to simultaneously transmit or receive an RLM-RS and data regardless of whether the UE has a UE capability for RRM.

<Control Over Scheduling Restrictions in RLM and RRM>

Scheduling restrictions in RLM are presumed to be more relaxed than scheduling restrictions in SSB-based/CSI-RS-based RRM measurement. SSB-based RRM measurement may be simply referred to as SSB measurement. CSI-RS-based RRM measurement may be simply referred to as CSI-RS measurement. In the present disclosure, an RS that is used in RRM measurement may be referred to as RRM-RS.

When a UE is configured to use the same-type reference signal in both RRM measurement and RLM measurement, the UE may apply different data transmission and reception control (may assume different scheduling restrictions) between RRM-RS measurement timing and RLM-RS measurement timing.

Using the same-type reference signal in both RRM measurement and RLM measurement may mean that, for example, both an RRM-RS and an RLM-RS are configured as SSBs or both an RRM-RS and an RLM-RS are configured as CSI-RSs.

Example 1

In the case of FR2, a UE is also expected to direct analog BF toward a neighbour cell during RRM measurement based on an SS block or a CSI-RS, so the UE is expected not to be able to simultaneously transmit or receive data with the RRM measurement. On the other hand, during RLM, depending on conditions (for example, when an RLM reference signal that is in QCL with an active TCI state is monitored), the UE may be expected to be able to simultaneously transmit and receive data with RLM.

Example 2

In a synchronous environment of FR1 and/or FR2, the arrival timing of a reference signal of a neighbour cell deviates by a propagation delay difference (+ inter-base station synchronization error) from the frame timing of a serving cell during RRM measurement. For this reason, a UE is expected not to be able to transmit or receive data for a symbol of an RRM reference signal (such as an SSB and a CSI-RS) and one symbol before and/or behind the symbol. On the other hand, the UE may be expected not to be able to simultaneously transmit or receive data only on a symbol of an RLM reference signal in RLM. This is because, in RLM, not a signal of a neighbour cell is monitored but only a signal of a own cell is monitored and, therefore, a margin for one or more symbols before and/or behind is not necessary.

According to the above-described second embodiment, a UE is able to appropriately assume scheduling restrictions on transmission and reception of data during RLM-RS measurement.

Third Embodiment

A third embodiment relates to transmission and reception of data during L1 measurement.

Initially, operations for transmitting and receiving data on an L1 measurement reference signal (L1-RS) symbol in PCell (primary cell)/PSCell (primary secondary cell) frequency (frequency including at least one of PCell and PSCell) will be described.

L1-RSRP measurement (a measurement for reference signal received power (RSRP) and beam failure detection in a physical layer) is a measurement of a physical layer, so it may be referred to as L1 measurement. An L1 measurement reference signal (which may be referred to as L1-RS, L1 measurement RS, or the like) of the present disclosure may be read as at least one of L1-RSRP reference signal and beam failure detection reference signal.

«FR1»

In FR1, when the SCS of an L1 measurement reference signal is the same as the SCS of data, a UE may assume that there are no scheduling restrictions. In other words, when the SCS of an L1 measurement reference signal is the same as the SCS of data, the UE may transmit and receive the data in L1 measurement. In the present disclosure, "in L1 measurement" may be read as "on an L1-RS symbol", "on an L1-RS symbol and one symbol before and/or behind the L1-RS symbol", or the like.

On the other hand, in FR1, when the SCS of an L1 measurement reference signal is different from the SCS of data, the UE may be compliant with, for example, the following scheduling restrictions (Alt. 1 to 3, including no scheduling restrictions).

(Alt. 1) A UE is not expected to simultaneously transmit or receive (is not able to transmit or receive) an L1 measurement reference signal and data. When the SCS of an L1 measurement reference signal is different from the SCS of data, the UE does not need to be expected to transmit or receive the data in L1 measurement. Such scheduling restrictions may be applied to all the UEs that perform communications at the same PCell/PSCell frequency as the UE.

(Alt. 2) A UE may be compliant with scheduling restrictions using a UE capability.

For example, in RRM measurement based on an SSB, a capability of simultaneous transmission and reception of data and an SSB with different numerologies (simultaneousRxDataSSB-DiffNumerology) is defined. When an L1 measurement reference signal (L1-RS) is an SSB, the UE capability (simultaneousRxDataSSB-DiffNumerology) may be reused. A UE having the UE capability may transmit and receive data in L1 measurement even when the SCS of an L1 measurement reference signal is different from the SCS of data. A UE having no UE capability may be expected not to be able to perform simultaneous transmission and reception (transmit or receive the data) when the SCS of an L1 measurement reference signal is different from the SCS of data (the UE does not need to be expected to simultaneous transmit or receive).

When an L1 measurement reference signal is an CSI-RS as well, the UE capability may be reused. Alternatively, even when the SCS of an L1 measurement reference signal is different from the SCS of data, a new UE capability that exhibits a UE capability to transmit and receive data in L1 measurement in which simultaneous transmission and reception is not assumed may be defined. When a UE has the new UE capability, the UE may be expected to be able to transmit and receive data in L1 measurement even when the SCS of an L1 measurement reference signal is different from the SCS of data.

When an L1 measurement reference signal is a specific reference signal (for example, CSI-RS), a UE may be expected not to be able to perform simultaneous transmission and reception (transmit or receive the data) (that is, a UE does not need to support simultaneous transmission and reception of data with an SCS different from the SCS of an L1 measurement reference signal).

(Alt. 3) A UE may assume that there are no scheduling restrictions. In other words, the UE may be expected to be able to simultaneously transmit and receive an L1 measurement reference signal and data with different SCSs (transmit and receive the data). Such scheduling restrictions may be applied when L1 measurement is especially handled.

«FR2»

In FR2, the following scheduling restrictions are conceivable from the viewpoint of analog BF.

In FR2, when the SCS of an L1 measurement reference signal is the same as the SCS of data, a UE may be compliant with, for example, the following scheduling restrictions (Alt. a to c, including no scheduling restrictions). In RRM measurement based on an SSB, analog reception BF is directed toward a neighbour cell, so the UE is disabled to perform simultaneous reception.

(Alt. a) A UE, not depending on other conditions (definitely), is expected not to be able to simultaneously transmit or receive an L1-RS and data.

(Alt. b) A UE is expected to be able to simultaneously receive an L1-RS and data depending on other conditions (for example, on an L1-RS symbol that is QCL with a PDCCH, or the like). For example, when only an RS that is QCL with an active TCI state (a beam of PDCCH) is monitored as an L1-RS (for example, when an L1-RS is not explicitly indicated), the UE may be expected to be able to simultaneously transmit and receive an L1-RS and data.

(Alt. c) A UE, not depending on other conditions (definitely), is expected to be able to simultaneously transmit and receive an L1-RS and data. In other words, the UE assumes that there are no scheduling restrictions. During L1 measurement, it is presumable that only a beam of a serving cell is a target to be measured. Therefore, with this assumption, it is possible to deal with a situation in which L1 measurement is performed only with the same beam as the beam of analog BF that is used for data.

In the above-described (Alt. 1 to 3), (Alt. a to c), and the like, different assumptions may be used between L1-RSRP measurement and beam failure detection. For example, a UE may be compliant with scheduling restrictions of (Alt. a) in L1-RSRP measurement and may be compliant with scheduling restrictions of (Alt. c) in beam failure detection.

On the other hand, in FR2, when the SCS of an L1 measurement reference signal is different from the SCS of data, the UE may be compliant with scheduling restrictions based on any one of the above-described Alt. 1 to 3 and Alt. a to c or any combination of them. When analog BF is common between data and L1 measurement, it influences whether it is possible to simultaneously transmit and receive data and an L1-RS with different SCSs, so this situation is dealt with.

Alt. 1 to 3 may be scheduling restrictions other than Alt. 1 to 3 in the case of different SCSs in FR1. Alt. a to c may be scheduling restrictions other than Alt. a to c in the case of the same SCSs in FR2.

<Scheduling Restrictions on Serving Cell in Intra-Band CA or Inter-Band CA>

Next, scheduling restrictions on a serving cell in intra-band CA or inter-band CA will be described.

«Intra-Band CA in FR1»

When intra-band CA is performed in FR1, a UE may be compliant with the following restrictions (scheduling restrictions) to transmit and receive data on a serving cell.

(Alt. 1) A UE may be compliant with the same scheduling restrictions as those on a serving cell on which L1 measurement is performed in FR1. (Alt. 1) corresponds to scheduling restrictions during RRM measurement based on an SSB, so (Alt. 1) is compatible with SSB measurement.

(Alt. 2) A UE may assume that there are no scheduling restrictions. In other words, when intra-band CA is performed in FR1, the UE may transmit and receive data on a serving cell during L1 measurement on another serving cell.

«Inter-Band CA in FR1»

When inter-band CA is performed in FR1, a UE may be compliant with the following restrictions (scheduling restrictions) to transmit and receive data on a serving cell.

(Alt. 1) A UE may be compliant with the same scheduling restrictions as those on a serving cell on which L1 measurement is performed in FR1.

(Alt. 2) A UE may assume that there are no scheduling restrictions. In other words, when inter-band CA is performed in FR1, the UE may transmit and receive data on a serving cell during L1 measurement on a serving cell of another band. (Alt. 2) corresponds to scheduling restrictions during RRM measurement based on an SSB, so (Alt. 2) is compatible with SSB measurement.

«Intra-Band CA in FR2»

When intra-band CA is performed in FR2, a UE may be compliant with the following restrictions (scheduling restrictions) to transmit and receive data on a serving cell.

(Alt. 1) A UE may be compliant with the same scheduling restrictions as those on a serving cell on which L1 measurement is performed in FR2. (Alt. 1) corresponds to scheduling restrictions during RRM measurement based on an SSB, so (Alt. 1) is compatible with SSB measurement.

(Alt. 2) A UE may assume that there are no scheduling restrictions. In other words, when intra-band CA is performed in FR2, the UE may transmit and receive data on a serving cell during L1 measurement on another serving cell.

«Inter-Band CA in FR2»

When inter-band CA is performed in FR2, a UE may be compliant with the following restrictions (scheduling restrictions) to transmit and receive data on a serving cell.

(Alt. 1) A UE may be compliant with the same scheduling restrictions as those on a serving cell on which L1 measurement is performed in FR2. (Alt. 1) corresponds to scheduling restrictions during RRM measurement based on an SSB, so (Alt. 1) is compatible with SSB measurement.

(Alt. 2) A UE may assume that there are no scheduling restrictions. In other words, when inter-band CA is performed in FR2, the UE may transmit and receive data on a serving cell during L1 measurement on a serving cell of another band.

«Inter-Band CA between FR1 and FR2»

When inter-band CA is performed between FR1 and FR2, a UE may assume that there are no scheduling restrictions on a serving cell. In other words, when inter-band CA is performed between FR1 and FR2, the UE may transmit and receive data on an FR1 serving cell during L1 measurement being performed on an FR2 serving cell. In addition, the UE may transmit and receive data on an FR2 serving cell during L1 measurement being performed on an FR1 serving cell.

Next, some examples of scheduling restrictions in the above-described various cases will be described in more details.

<Case where L1 Measurement Reference Signal (L1-RS) is SS Block and Case where L1-RS is CSI-RS>

Different scheduling restrictions may be defined according to a type (kind) of an L1 measurement reference signal (L1-RS) (for example, between a case of SS block and a case of CSI-RS). A UE may determine whether to be able to simultaneously transmit and receive an L1-RS and data based on first scheduling restrictions when an SSB is configured as an L1-RS and may determine whether to be able to simultaneously transmit and receive an L1-RS and data based on second scheduling restrictions when a CSI-RS is configured as an L1-RS.

For example, when the SCS of an L1 measurement reference signal is different from the SCS of data and the L1 measurement reference signal is an SS block in FR1, whether simultaneous transmission and reception is possible may be determined in accordance with whether a UE has a certain UE capability (for example, a UE capability for RRM (simultaneousRxDataSSB-DiffNumerology or the like)).

When an L1 measurement reference signal is a CSI-RS in FR1, it is assumed that a UE capability that defines a measurement based on a CSI-RS (a UE capability for RRM based on a CSI-RS) is not always available. For this reason, when an L1 measurement reference signal is a CSI-RS, a UE may be expected not to be able to simultaneously transmit or receive an L1-RS and data regardless of whether the UE has a UE capability for RRM.

<Control Over Scheduling Restrictions in L1 Measurement and RRM>

Scheduling restrictions in L1 measurement are presumed to be more relaxed than scheduling restrictions in SSB-based/CSI-RS-based RRM measurement. SSB-based RRM measurement may be simply referred to as SSB measurement. CSI-RS-based RRM measurement may be simply referred to as CSI-RS measurement.

When a UE is configured to use the same-type reference signal in both RRM measurement and L1 measurement, the UE may apply different data transmission and reception control (may assume different scheduling restrictions) between RRM-RS measurement timing and L1-RS measurement timing.

Using the same-type reference signal in both RRM measurement and L1 measurement may mean that, for example, both an RRM-RS and an L1-RS are configured as SSBs or both an RRM-RS and an L1-RS are configured as CSI-RSs.

When a UE is configured to use the same-type reference signal in both RLM measurement and L1 measurement, the UE may apply different data transmission and reception control (may assume different scheduling restrictions) between RLM-RS measurement timing and L1-RS measurement timing.

Example 1

In the case of FR2, a UE is also expected to direct analog BF toward a neighbour cell during RRM measurement based on an SS block or a CSI-RS, so the UE is expected not to be able to simultaneously transmit or receive data with the RRM measurement. On the other hand, since only a beam of a serving cell is a target to be measured during L1 measurement, the UE may be expected to be able to simultaneously transmit and receive data with L1 measurement at least under specific conditions (for example, when only an RS that is QCL with an active TCI state (a beam of a PDCCH) is monitored as an L1-RS.

Example 2

In a synchronous environment of FR1 and/or FR2, the arrival timing of a reference signal of a neighbour cell deviates by a propagation delay difference (+inter-base station synchronization error) from the frame timing of a serving cell during RRM measurement. For this reason, a UE is expected not to be able to transmit or receive data for a symbol of an RRM reference signal (such as an SSB and a CSI-RS) and one symbol before and/or behind the symbol. On the other hand, the UE may be expected not to be able to simultaneously transmit or receive data only on a symbol of an L1 measurement reference signal in L1 measurement. This is because, in L1 measurement, not a signal of a neighbour cell is monitored but only a signal of a own cell is monitored and, therefore, a margin for one or more symbols before and/or behind is not necessary.

According to the above-described third embodiment, a UE is able to appropriately assume scheduling restrictions on transmission and reception of data during L1 measurement.

<Modifications>

When at least two of RRM measurement (for example, SSB measurement or CSI-RS measurement), RLM-RS measurement, and L1 measurement are performed in the same symbol, it may be assumed that any one of scheduling restrictions on transmission and reception of data, expected in measurements to be performed, is preferentially applied (for example, the strictest scheduling restrictions are applied).

For example, when CSI-RS measurement and RLM-RS measurement are performed in the same symbol, a UE is expected not to be able to simultaneously transmit or receive data with CSI-RS measurement, and the UE is expected to be able to simultaneously transmit and receive data with RLM-RS measurement, the UE may be expected not to be able to transmit or receive data in the symbol.

In the above-described embodiments, description is made mainly on the assumption of the configuration in which multiple carriers are included in one frequency range and multiple cells are included in one carrier. In the present disclosure, frequency range, cell, serving cell, carrier, band, and CC may be read as one another.

In the present disclosure, "different-frequency measurement" may be read as "hand over", and, in this case, "target to be measured" may be read as "target".

(Wireless Communication System)

Hereinafter, the configuration of a wireless communication system according to an embodiment of the present disclosure will be described. In this wireless communication system, communications are performed by using any one or any combination of the wireless communication methods according to the above-described embodiments of the present disclosure.

Figure 5:
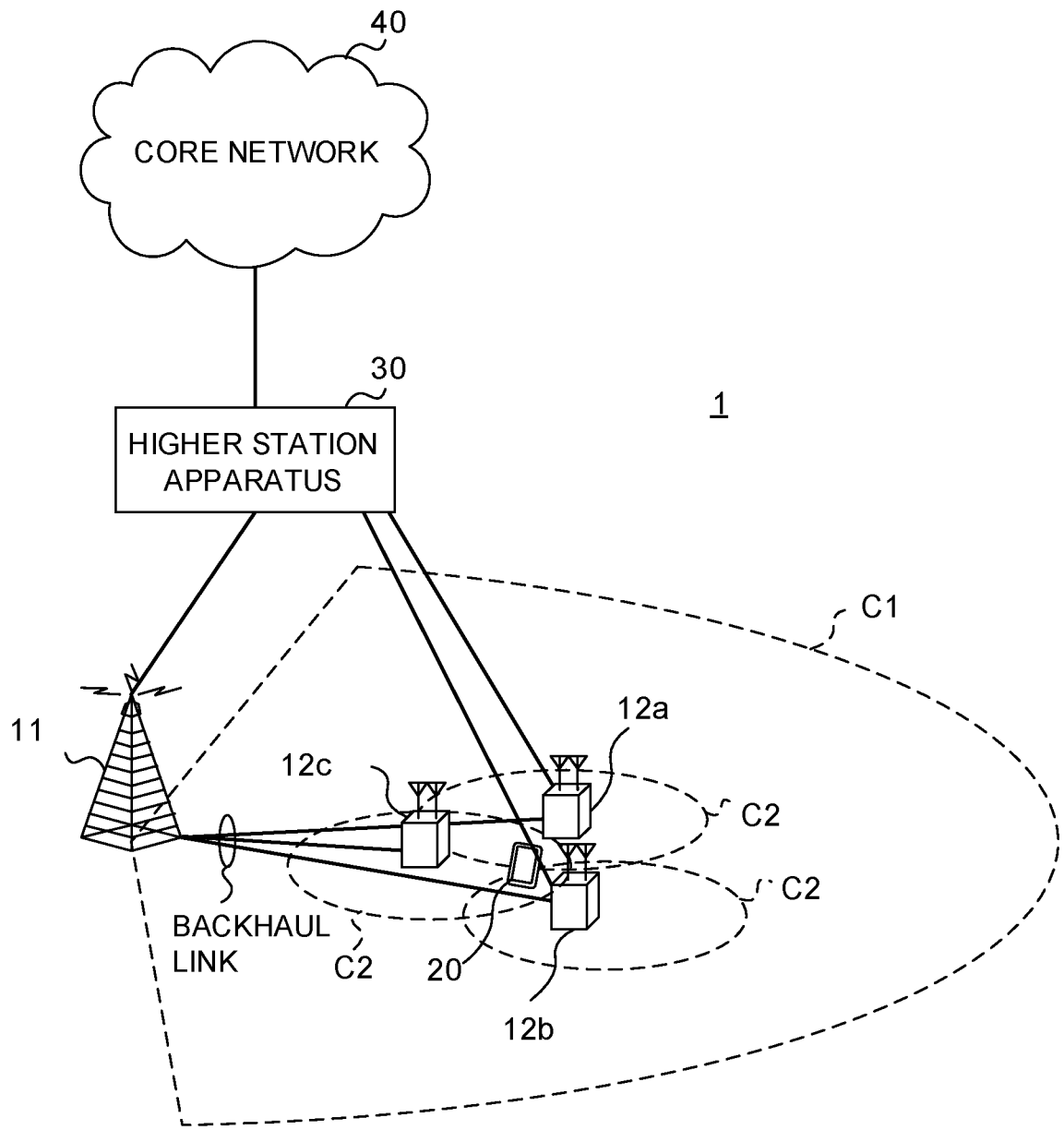
FIG. 5 is a diagram showing an example of the schematic configuration of a wireless communication system according to an embodiment.

FIG. 5 is a diagram showing an example of the schematic configuration of the wireless communication system according to the embodiment. In the wireless communication system 1, it is possible to apply carrier aggregation and/or dual connectivity (DC) that integrates multiple fundamental frequency blocks (component carriers) using the system bandwidth (for example, 20 MHz) of an LTE system as one unit.

The wireless communication system 1 may be called LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), NR (New Radio), FRA (Future Radio Access), New-RAT (Radio Access Technology), or the like or may be called a system that implements any one of them.

The wireless communication system 1 includes a radio base station 11 that forms a macrocell C1 with a relatively wide coverage, and radio base stations 12 (12a to 12c) that each form a small cell C2 arranged inside the macrocell C1 and narrower than the macrocell C1. A user terminal 20 is arranged in the macrocell C1 and the small cells C2. The arrangement and the number of the cells and the user terminals 20 are not limited to the embodiment shown in the drawing.

The user terminal 20 is capable of establishing connection with both the radio base station 11 and each radio base station 12. It is conceivable that the user terminal 20 simultaneously uses the macrocell C1 and the small cells C2 by using CA or DC. The user terminal 20 may apply CA or DC by using multiple cells (CC).

The user terminal 20 and the radio base station 11 are capable of communicating with each other by using a carrier with a narrow bandwidth in a relatively low frequency band (for example, 2 GHz) (also referred to as existing carrier, legacy carrier, or the like). On the other hand, the user terminal 20 and each radio base station 12 may use a carrier with a wide bandwidth in a relatively high frequency band (for example, 3.5 GHz, 5 GHz, or the like) or may use the same carrier that is used between the user terminal 20 and the radio base station 11. The configuration of frequency bands that are used by the radio base stations is not limited thereto.

The user terminal 20 is capable of performing communications in each cell by using time division duplex (TDD) and/or frequency division duplex (FDD). In each cell (carrier), a single numerology may be applied or multiple different numerologies may be applied.

A numerology may be a communication parameter that is applied to transmission and/or reception of a signal and/or a channel and may represent at least one of, for example, a sub-carrier spacing, a bandwidth, a symbol length, a cyclic prefix length, a sub-frame length, a TTI length, the number of symbols per TTI, a radio frame configuration, a specific filtering process that is executed by a transceiver in a frequency domain, a specific windowing process that is executed by a transceiver in a time domain, and the like. For example, when the sub-carrier spacing of composing OFDM symbols is different and/or the number of OFDM symbols is different in one physical channel, it may be regarded that the numerology is different.

The radio base station 11 and each radio base station 12 (or the two radio base stations 12) may be connected by wire (for example, optical fibers, an X2 interface, or the like compliant with CPRI (Common Public Radio Interface)) or wirelessly.

The radio base station 11 and the radio base stations 12 each are connected to a higher station apparatus 30 and is further connected to a core network 40 via the higher station apparatus 30. Examples of the higher station apparatus 30 include an access gateway apparatus, a radio network controller (RNC), and a mobility management entity (MME); however, the higher station apparatus 30 is not limited thereto. The radio base stations 12 may be connected to the higher station apparatus 30 via the radio base station 11.

The radio base station 11 is a radio base station with a relatively wide coverage and may be referred to as macro base station, aggregation node, eNB (eNodeB), transmission/reception point, or the like. Each radio base station 12 is a radio base station with a local coverage and may be referred to as small base station, micro base station, pico base station, femto base station, HeNB (Home eNodeB), RRH (Remote Radio Head), transmission/reception point, or the like. Hereinafter, when the radio base stations 11, 12 are not distinguished from each other, the radio base stations 11, 12 are collectively referred to as radio base stations 10.

The user terminals 20 are terminals that support various communication modes, such as LTE and LTE-A, and may include not only mobile communication terminals (mobile stations) but also fixed communication terminals (fixed stations).

In the wireless communication system 1, as radio access modes, orthogonal frequency division multiple access (OFDMA) is applied for downlink, and single carrier frequency division multiple access (SC-FDMA) and/or OFDMA is applied for uplink.

OFDMA is a multi-carrier transmission mode that performs communications by dividing a frequency band into multiple narrow frequency bands (sub-carriers) and mapping pieces of data to the sub-carriers. SC-FDMA is a single-carrier transmission mode that reduces interference between terminals by dividing a system bandwidth into bands composed of one or successive resource blocks for each terminal and causing multiple terminals to use different bands. Uplink and downlink radio access modes are not limited to these combinations, and other radio access modes may be used.

In the wireless communication system 1, a downlink shared channel (PDSCH: physical downlink shared channel) that is shared by the user terminals 20, a broadcast channel (PBCH: physical broadcast channel), a downlink L1/L2 control channel, or the like is used as a downlink channel. User data, upper layer control information, an SIB (system information block), and the like are transmitted via a PDSCH. An MIB (master information block) is transmitted via a PBCH.

A downlink L1/L2 control channel includes a PDCCH (physical downlink control channel), an EPDCCH (enhanced physical downlink control channel), a PCFICH (physical control format indicator channel), a PHICH (physical hybrid-ARQ indicator channel), and the like. Downlink control information (DCI) containing scheduling information of a PDSCH and/or a PUSCH and other information are transmitted via a PDCCH.

DCI to schedule DL data reception may be called DL assignment, and DCI to schedule UL data transmission may be called UL grant.

The number of OFDM symbols to be used for a PDCCH is transmitted via a PCFICH. Receipt confirmation information of HARQ (Hybrid Automatic Repeat reQuest) for a PUSCH (for example, also referred to as retransmission control information, HARQ-ACK, ACK/NACK, or the like) is transmitted via a PHICH. An EPDCCH is frequency division multiplexed with a PDSCH (downlink shared data channel) and used to transmit DCI and the like as in the case of a PDCCH.

In the wireless communication system 1, an uplink shared channel (PUSCH: physical uplink shared channel) that is shared by the user terminals 20, an uplink control channel (PUCCH: physical uplink control channel), a random access channel (PRACH: physical random access channel), or the like is used as an uplink channel. User data, upper layer control information, and the like are transmitted via a PUSCH. Downlink radio quality information (CQI: channel quality Indicator), receipt confirmation information, scheduling request (SR), or the like is transmitted via a PUCCH. A random access preamble for establishing connection with a cell is transmitted via a PRACH.

In the wireless communication system 1, a cell-specific reference signal (CRS), a channel state information-reference signal (CSI-RS), a demodulation reference signal (DMRS), a positioning reference signal (PRS), or the like is transmitted as a downlink reference signal. In the wireless communication system 1, a sounding reference signal (SRS), a demodulation reference signal (DMRS), or the like is transmitted as an uplink reference signal. A DMRS may be referred to as user terminal-specific reference signal (UE-specific reference signal). Reference signals to be transmitted are not limited thereto.

(Radio Base Station)

Figure 6:
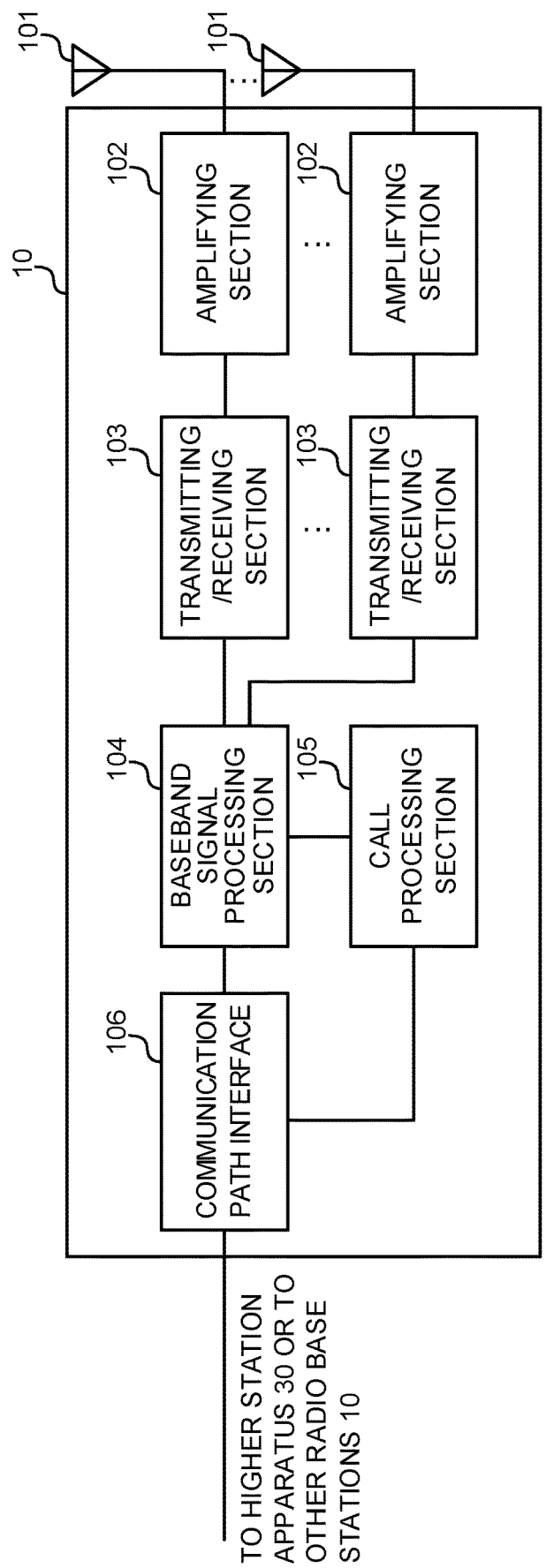
FIG. 6 is a diagram showing an example of the overall configuration of a radio base station according to the embodiment.

FIG. 6 is a diagram showing an example of the overall configuration of a radio base station according to the embodiment. The radio base station 10 includes multiple transmitting/receiving antennas 101, amplifying sections 102, transmitting/receiving sections 103, a baseband signal processing section 104, a call processing section 105, and a communication path interface 106. It is sufficient that the radio base station 10 includes at least one of each of the transmitting/receiving antenna 101, the amplifying section 102, and the transmitting/receiving section 103.

User data that is transmitted from the radio base station 10 to the user terminal 20 by downlink is input from the higher station apparatus 30 to the baseband signal processing section 104 via the communication path interface 106.

In the baseband signal processing section 104, user data is subjected to an RLC layer transmission process, such as a PDCP (packet data convergence protocol) layer process, division and combination of user data, and RLC (Radio Link Control) retransmission control, and a transmission process, such as MAC (Medium Access Control) retransmission control (for example, a HARQ transmission process), scheduling, transmission format selection, channel coding, an inverse Fast Fourier transform (IFFT) process, and a precoding process, and is transferred to the transmitting/receiving section 103. A downlink control signal is also subjected to a transmission process, such as channel coding and inverse Fast Fourier transform, and is transferred to the transmitting/receiving section 103.

The transmitting/receiving section 103 converts a baseband signal pre-coded for each antenna and output from the baseband signal processing section 104 into a radio frequency band and transmits a signal in the radio frequency band. The radio frequency signal frequency-converted by the transmitting/receiving section 103 is amplified by the amplifying section 102 and is transmitted from the transmitting/receiving antenna 101. The transmitting/receiving section 103 may be a transmitter/receiver, a transmitting/receiving circuit, or a transmitting/receiving apparatus that is described based on common knowledge in the technical field concerning the present disclosure. The transmitting/receiving section 103 may be an integrated transmitting/receiving section or may be a pair of transmitting section and receiving section.

On the other hand, for an uplink signal, a radio frequency signal received by the transmitting/receiving antenna 101 is amplified by the amplifying section 102. The transmitting/receiving section 103 receives the uplink signal amplified by the amplifying section 102. The transmitting/receiving section 103 converts the received signal in frequency to a baseband signal and outputs the baseband signal to the baseband signal processing section 104.

In the baseband signal processing section 104, user data contained in the input uplink signal is subjected to a reception process such as a Fast Fourier transform (FFT) process, an inverse discrete Fourier transform (IDFT) process, error correction decoding, and MAC retransmission control, and RLC layer and PDCP layer reception processes, and is transferred to the higher station apparatus 30 via the communication path interface 106. The call processing section 105 executes a process of calling (such as configuring and releasing) a communication channel, status management of the radio base station 10, management of radio resources, and the like.

The communication path interface 106 transmits or receives signals to or from the higher station apparatus 30 via a certain interface. The communication path interface 106 may transmit or receive signals to or from another radio base station 10 via an inter-base station interface (for example, optical fibers or an X2 interface compliant with CPRI (Common Public Radio Interface)) (backhaul signaling).

The transmitting/receiving section 103 may further include an analog beam forming section that performs analog beam forming. The analog beam forming section may be an analog beam forming circuit ((for example, a phase shifter or a phase shift circuit) or an analog beam forming apparatus (for example, a phase shifter) that is described based on common knowledge in the technical field concerning the present invention. The transmitting/receiving antenna 101 may be, for example, an array antenna.

Figure 7:
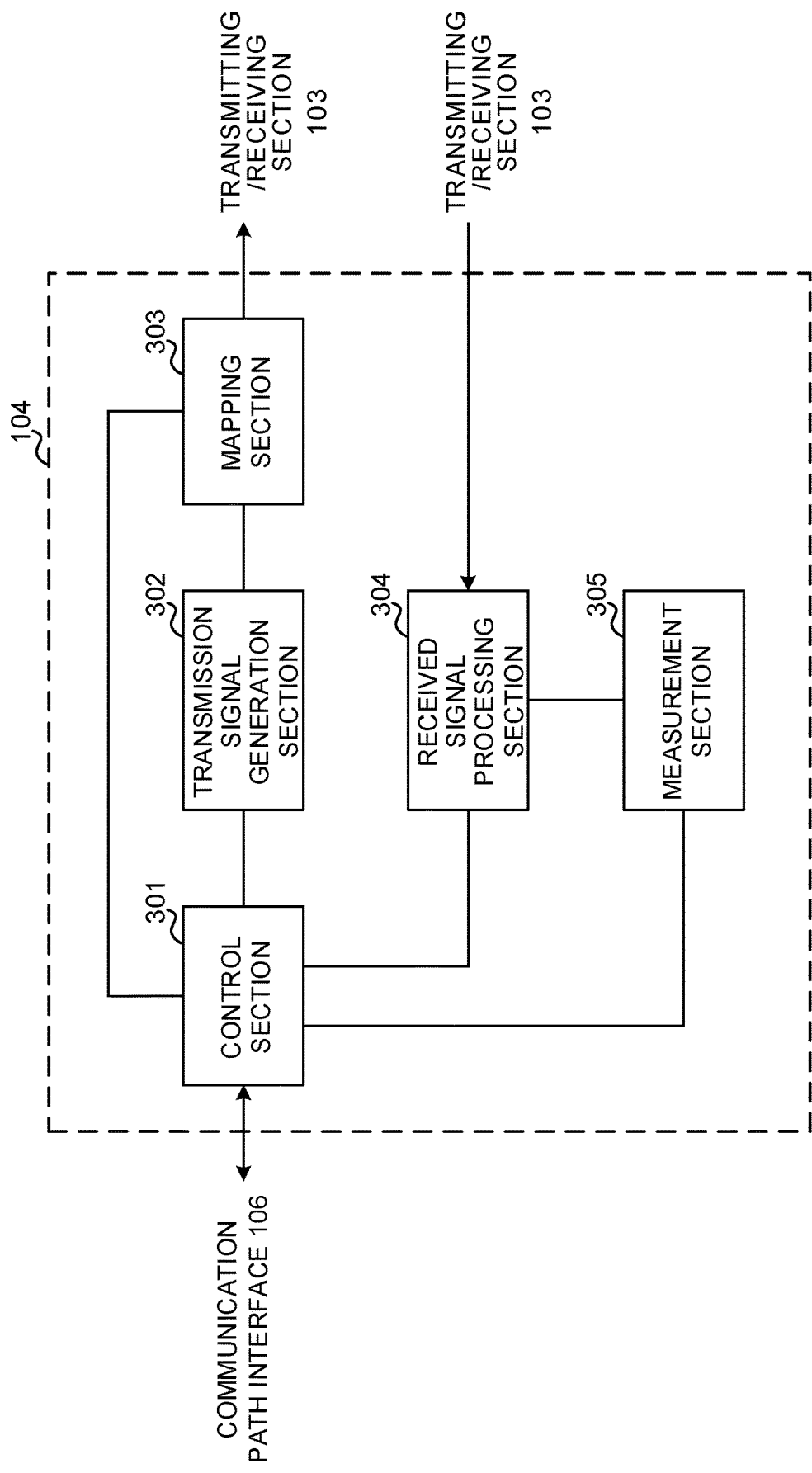
FIG. 7 is a diagram showing an example of the functional configuration of the radio base station according to the embodiment.

FIG. 7 is a diagram showing an example of the functional configuration of the radio base station according to the embodiment of the present disclosure. In this example, functional blocks of characterized portions in the present embodiment are mainly shown, and the radio base station 10 may be assumed to include other functional blocks required for wireless communication.

The baseband signal processing section 104 includes at least a control section (scheduler) 301, a transmission signal generation section 302, a mapping section 303, a received signal processing section 304, and a measurement section 305. It is sufficient that these components are included in the radio base station 10, and part or all of the components do not need to be included in the baseband signal processing section 104.

The control section (scheduler) 301 generally controls the radio base station 10. The control section 301 may be a controller, a control circuit, or a control apparatus that is described based on common knowledge in the technical field concerning the present disclosure.

The control section 301 controls, for example, the generation of a signal in the transmission signal generation section 302, the allocation of a signal in the mapping section 303, and the like. The control section 301 also controls a process of receiving a signal in the received signal processing section 304, the measurement of a signal in the measurement section 305, and the like.

The control section 301 controls the scheduling (for example, resource allocation) of system information, a downlink data signal (for example, a signal that is transmitted via a PDSCH), a downlink control signal (for example, a signal that is transmitted via a PDCCH and/or an EPDCCH; receipt confirmation information or the like). The control section 301 also controls the generation of a downlink control signal, a downlink data signal, and the like based on a result of determination as to whether retransmission control on an uplink data signal is required, or the like.

The control section 301 also controls the scheduling of a synchronization signal (for example, PSS (primary synchronization signal)/SSS (secondary synchronization signal)), a downlink reference signal (for example, CRS, CSI-RS, or DMRS), and the like.

The control section 301 also controls the scheduling of an uplink data signal (for example, a signal that is transmitted via a PUSCH), an uplink control signal (for example, a signal that is transmitted via a PUCCH and/or a PUSCH; receipt confirmation information or the like), a random access preamble (for example, a signal that is transmitted via a PRACH), an uplink reference signal, and the like.

The control section 301 may execute control to form a transmission beam and/or a reception beam by using digital BF (for example, pre-coding) in the baseband signal processing section 104 and/or analog BF (for example, phase rotation) in the transmitting/receiving section 103. The control section 301 may execute control to form a beam based on downlink propagation path information, uplink propagation path information, or the like. These pieces of propagation path information may be acquired from the received signal processing section 304 and/or the measurement section 305.

The transmission signal generation section 302 generates a downlink signal (a downlink control signal, a downlink data signal, a downlink reference signal, or the like) and outputs the downlink signal to the mapping section 303 based on an instruction from the control section 301. The transmission signal generation section 302 may be a signal generator, a signal generation circuit, or a signal generation apparatus that is described based on common knowledge in the technical field concerning the present disclosure.

The transmission signal generation section 302, for example, generates DL assignment that provides downlink data allocation information and/or UL grant that provides uplink data allocation information based on an instruction from the control section 301. DL assignment and UL grant each are DCI and are in accordance with a DCI format. A downlink data signal is encoded and modulated in accordance with an encoding ratio, a modulation mode, and the like determined based on channel state information (CSI) and the like from each user terminal 20.

The mapping section 303 maps a downlink signal generated by the transmission signal generation section 302 to certain radio resources and outputs the downlink signal to the transmitting/receiving section 103 based on an instruction from the control section 301. The mapping section 303 may be a mapper, a mapping circuit, or a mapping apparatus that is described based on common knowledge in the technical field concerning the present disclosure.

The received signal processing section 304 executes a reception process (for example, demapping, demodulation, decoding, or the like) on a received signal input from the transmitting/receiving section 103. A received signal is, for example, an uplink signal (an uplink control signal, an uplink data signal, an uplink reference signal, or the like) that is transmitted from the user terminal 20. The received signal processing section 304 may be a signal processor, a signal processing circuit, or a signal processing apparatus that is described based on common knowledge in the technical field concerning the present disclosure.

The received signal processing section 304 outputs information decoded through the reception process to the control section 301. When, for example, the received signal processing section 304 receives a PUCCH containing HARQ-ACK, the received signal processing section 304 outputs HARQ-ACK to the control section 301. The received signal processing section 304 outputs a received signal and/or a signal subjected to the reception process to the measurement section 305.

The measurement section 305 performs a measurement on a received signal. The measurement section 305 may be a measuring instrument, a measurement circuit, or a measurement device that is described based on common knowledge in the technical field concerning the present disclosure.

The measurement section 305 may, for example, perform RRM (radio resource management) measurement, channel estimation, or the like based on a received signal. The measurement section 305 may measure a received power (for example, RSRP (reference signal received power)), received quality (for example, RSRQ (reference signal received quality), SINR (signal to interference plus noise ratio), SNR (signal to noise ratio)), signal strength (for example, RSSI (received signal strength indicator)), propagation path information (for example, CSI (channel state information)), or the like. A measured result may be output to the control section 301.

The transmitting/receiving section 103 transmits at least one of an SSB, a CSI-RS, an RLM-RS, and an L1-RS. The transmitting/receiving section 103 may transmit and/or receive data in a cell in which at least one of SSB measurement, CSI-RS measurement, RLM-RS measurement, and L1 measurement is configured. The transmitting/receiving section 103 may transmit information on same-frequency measurement and/or different-frequency measurement, or the like to the user terminal 20.

(User Terminal)

Figure 8:
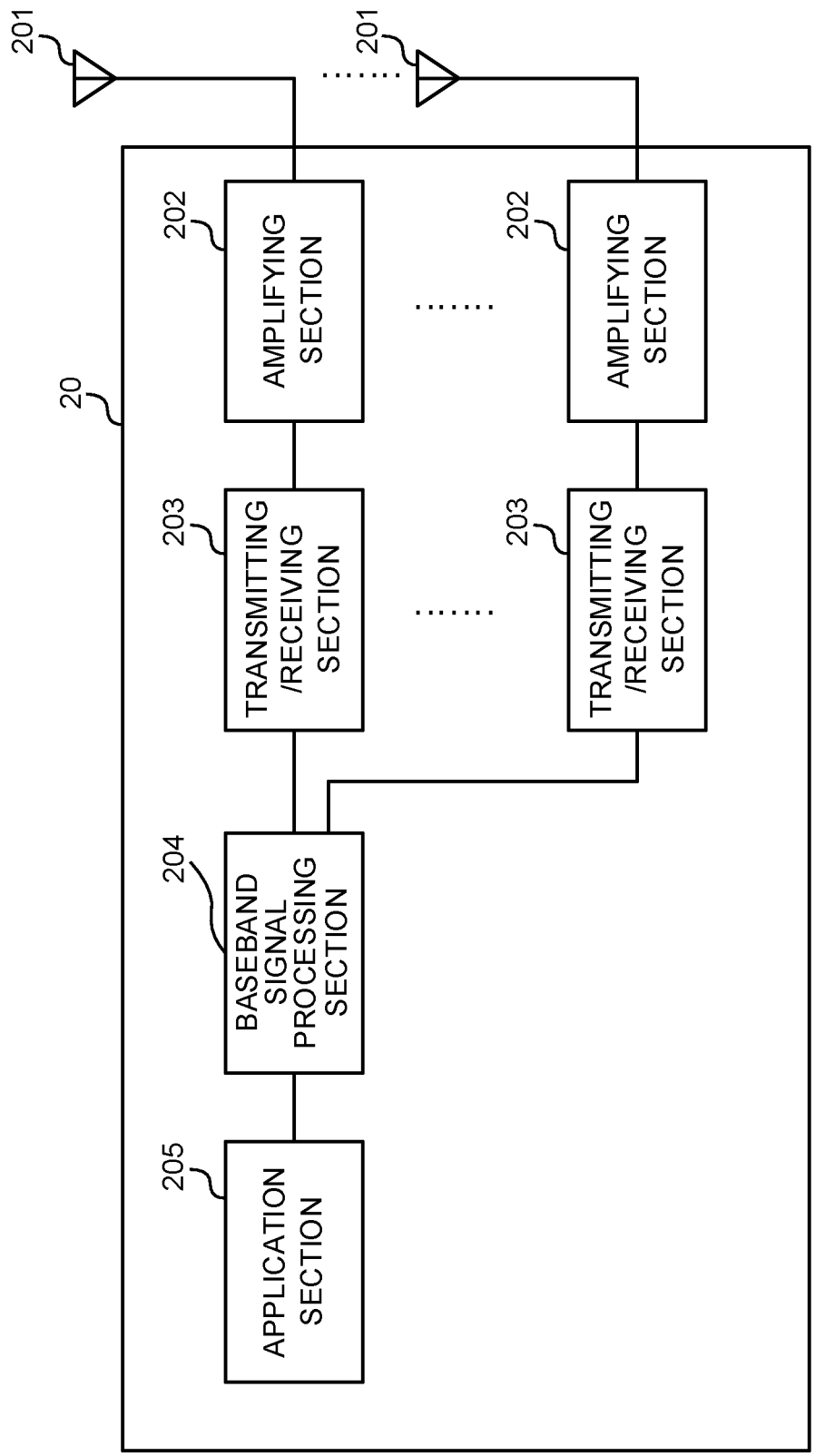
FIG. 8 is a diagram showing an example of the overall configuration of a user terminal according to the embodiment.

FIG. 8 is a diagram showing an example of the overall configuration of the user terminal according to the embodiment. The user terminal 20 includes multiple transmitting/receiving antennas 201, amplifying sections 202, transmitting/receiving sections 203, a baseband signal processing section 204, and an application section 205. It is sufficient that the user terminal 20 includes at least one of each of the transmitting/receiving antenna 201, the amplifying section 202, and the transmitting/receiving section 203.

A radio frequency signal received by the transmitting/receiving antenna 201 is amplified by the amplifying section 202. The transmitting/receiving section 203 receives a downlink signal amplified by the amplifying section 202. The transmitting/receiving section 203 converts the received signal in frequency to a baseband signal and outputs the baseband signal to the baseband signal processing section 204. The transmitting/receiving section 203 may be a transmitter/receiver, a transmitting/receiving circuit, or a transmitting/receiving apparatus that is described based on common knowledge in the technical field concerning the present disclosure. The transmitting/receiving section 203 may be an integrated transmitting/receiving section or may be a pair of transmitting section and receiving section.

The baseband signal processing section 204 executes a reception process such as FFT process, error correction decoding, and retransmission control, or the like on the input baseband signal. Downlink user data is transferred to the application section 205. The application section 205 executes a process related to a layer upper than a physical layer and a MAC layer, or other processes. Within downlink data, broadcast information may also be transferred to the application section 205.

On the other hand, uplink user data is input from the application section 205 to the baseband signal processing section 204. In the baseband signal processing section 204, the uplink user data is subjected to a transmission process (for example, HARQ transmission process) of retransmission control, channel coding, pre-coding, a discrete Fourier transform (DFT) process, an IFFT process, and the like and is transferred to the transmitting/receiving section 203.

The transmitting/receiving section 203 converts a baseband signal output from the baseband signal processing section 204 into a radio frequency band and transmits a signal in the radio frequency band. The radio frequency signal frequency-converted by the transmitting/receiving section 203 is amplified by the amplifying section 202 and is transmitted from the transmitting/receiving antenna 201.

The transmitting/receiving section 203 may further include an analog beam forming section that performs analog beam forming. The analog beam forming section may be an analog beam forming circuit ((for example, a phase shifter or a phase shift circuit) or an analog beam forming device (for example, a phase shifter) that is described based on common knowledge in the technical field concerning the present invention. The transmitting/receiving antenna 201 may be, for example, an array antenna.

Figure 9:
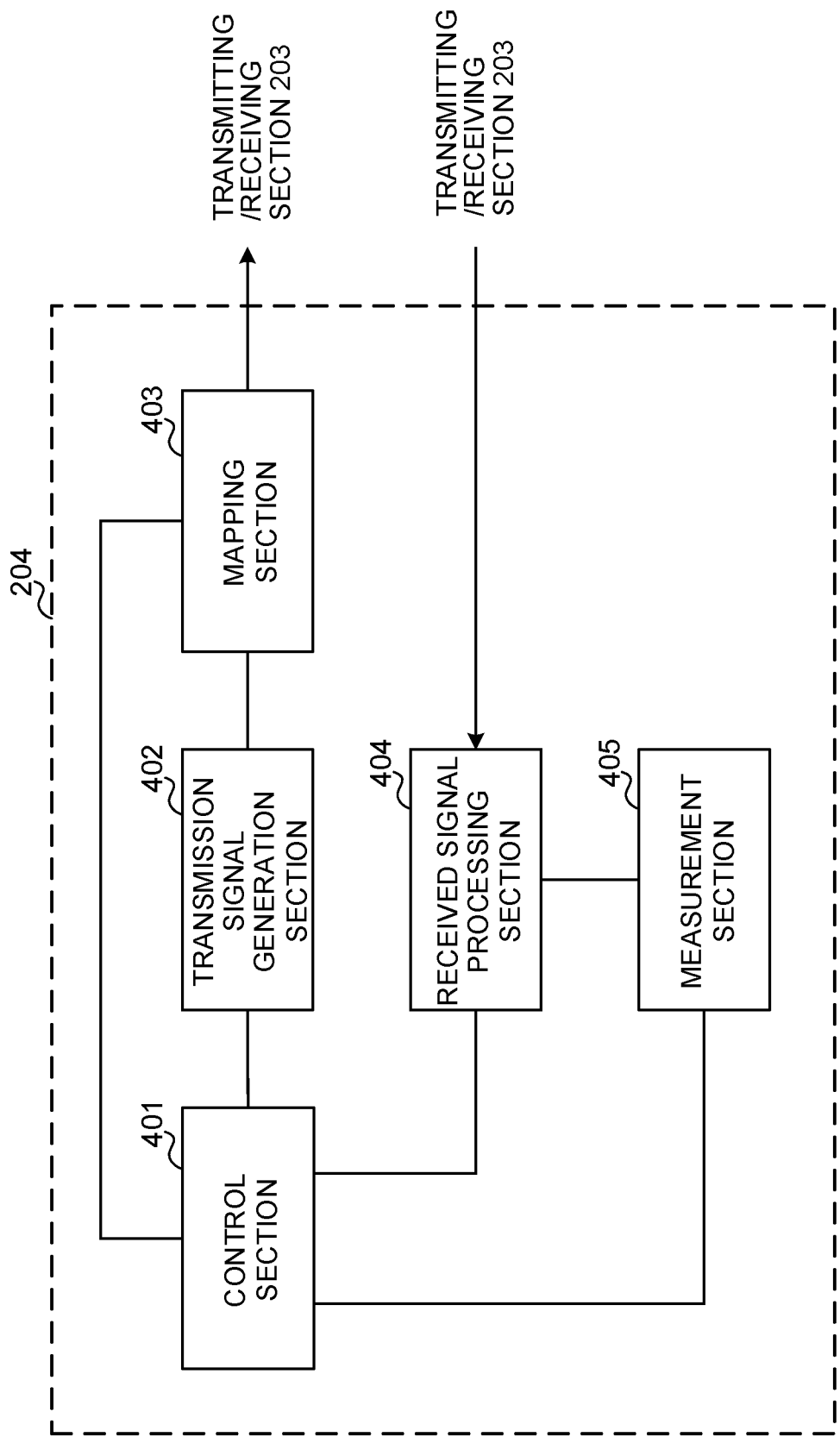
FIG. 9 is a diagram showing an example of the functional configuration of the user terminal according to the embodiment.

FIG. 9 is a diagram showing an example of the functional configuration of the user terminal according to the embodiment. In this example, functional blocks of characterized portions in the present embodiment are mainly shown, and the user terminal 20 may be assumed to include other functional blocks required for wireless communication.

The baseband signal processing section 204 of the user terminal 20 includes at least a control section 401, a transmission signal generation section 402, a mapping section 403, a received signal processing section 404, and a measurement section 405. It is sufficient that these components are included in the user terminal 20, and part or all of the components do not need to be included in the baseband signal processing section 204.

The control section 401 generally controls the user terminal 20. The control section 401 may be a controller, a control circuit, or a control apparatus that is described based on common knowledge in the technical field concerning the present disclosure.

The control section 401 controls, for example, the generation of a signal in the transmission signal generation section 402, the allocation of a signal in the mapping section 403, and the like. The control section 401 also controls a process of receiving a signal in the received signal processing section 404, measurement of a signal in the measurement section 405, and the like.

The control section 401 acquires, from the received signal processing section 404, a downlink control signal and a downlink data signal transmitted from the radio base station 10. The control section 401 controls the generation of an uplink control signal and/or an uplink data signal based on a result of determination as to whether retransmission control on a downlink control signal and/or a downlink data signal is required, or the like.

The control section 401 may execute control to form a transmission beam and/or a reception beam by using digital BF (for example, pre-coding) in the baseband signal processing section 204 and/or analog BF (for example, phase rotation) in the transmitting/receiving section 203. The control section 401 may execute control to form a beam based on downlink propagation path information, uplink propagation path information, or the like. These pieces of propagation path information may be acquired from the received signal processing section 404 and/or the measurement section 405.

When the control section 401 acquires, from the received signal processing section 404, various pieces of information provided from the radio base station 10, the control section 401 may update parameters used for control based on the information.

The transmission signal generation section 402 generates an uplink signal (an uplink control signal, an uplink data signal, an uplink reference signal, or the like) and outputs the downlink signals to the mapping section 403 based on an instruction from the control section 401. The transmission signal generation section 402 may be a signal generator, a signal generation circuit, or a signal generation apparatus that is described based on common knowledge in the technical field concerning the present disclosure.

The transmission signal generation section 402, for example, generates an uplink control signal related to receipt confirmation information, channel state information (CSI), or the like based on an instruction from the control section 401. The transmission signal generation section 402 also generates an uplink data signal based on an instruction from the control section 401. When, for example, a downlink control signal that is provided from the radio base station 10 contains UL grant, the transmission signal generation section 402 is instructed by the control section 401 to generate an uplink data signal.

The mapping section 403 maps an uplink signal generated by the transmission signal generation section 402 to radio resources and outputs the uplink signal to the transmitting/receiving section 203 based on an instruction from the control section 401. The mapping section 403 may be a mapper, a mapping circuit, or a mapping apparatus that is described based on common knowledge in the technical field concerning the present disclosure.

The received signal processing section 404 executes a reception process (for example, demapping, demodulation, decoding, or the like) on a received signal input from the transmitting/receiving section 203. A received signal is, for example, a downlink signal (a downlink control signal, a downlink data signal, a downlink reference signal, or the like) that is transmitted from the radio base station 10. The received signal processing section 404 may be a signal processor, a signal processing circuit, or a signal processing apparatus that is described based on common knowledge in the technical field concerning the present disclosure. The received signal processing section 404 may also be a receiving section according to the present disclosure.

The received signal processing section 404 outputs information decoded through the reception process to the control section 401. The received signal processing section 404 outputs, for example, broadcast information, system information, RRC signaling, DCI, or the like to the control section 401. The received signal processing section 404 outputs a received signal and/or a signal subjected to the reception process to the measurement section 405.

The measurement section 405 performs a measurement on a received signal. The measurement section 405 may be a measuring instrument, a measurement circuit, or a measurement apparatus that is described based on common knowledge in the technical field concerning the present disclosure.

The measurement section 405 may, for example, perform RRM measurement, channel estimation, or the like based on a received signal. The measurement section 405 may measure a received power (for example, RSRP), received quality (for example, RSRQ, SINR, SNR), signal strength (for example, RSSI), propagation path information (for example, CSI), or the like. A measured result may be output to the control section 401.

The transmitting/receiving section 203 receives at least one of an SSB, a CSI-RS, an RLM-RS, and an L1-RS. A received RS may be used for measurement in the measurement section 405. The transmitting/receiving section 203 may transmit and/or receive data in a cell in which at least one of SSB measurement, CSI-RS measurement, RLM-RS measurement, and L1 measurement is configured.

The control section 401 may determine whether to (whether it is possible to) control transmission and reception of data at CSI-RS measurement timing based on whether the control section 401 is able to assume a synchronous environment.

When the control section 401 is able to assume a synchronous environment, the control section 401 does not need to be expected to transmit or receive data with a sub-carrier spacing different from the sub-carrier spacing of the CSI-RS in a symbol of the CSI-RS and one symbol before and/or behind the symbol.

When the control section 401 is not able to assume a synchronous environment, the control section 401 may measure within a measurement gap the CSI-RS with a sub-carrier spacing different from the sub-carrier spacing of data in a serving cell and does not need to be expected to transmit or receive data in the serving cell within the measurement gap.

When the control section 401 is not able to assume a synchronous environment, the control section 401 may measure the CSI-RS within a configured certain period and does not need to be expected to transmit or receive data with a sub-carrier spacing different from the sub-carrier spacing of the CSI-RS within the certain period.

When there is any CSI-RS in which no associated synchronization signal block is configured among all the configured CSI-RSs, the control section 401 may assume a synchronous environment.

The measurement section 405 may perform at least one of a measurement for radio link monitoring (RLM) and L1 measurement by using a certain reference signal in a specific frequency band.

The control section 401 may control transmission and reception of data in the specific frequency band during the measurement based on a sub-carrier spacing (SCS) of the certain reference signal. "Control transmission and reception of data" may include control whether to transmit and receive data.

The control section 401 may control the transmission and reception of data based on a relationship between the sub-carrier spacing of the certain reference signal and a sub-carrier spacing of data.

The control section 401 may control the transmission and reception of data by using information indicating a UE capability associated with RRM (radio resource management) measurement.

The control section 401 may assume that a condition in which it is possible to transmit and receive data during at least one of the measurement for RLM and L1 measurement is more relaxed (easier) than a condition in which it is possible to transmit and receive data during the RRM measurement. "Relaxed" is described in the examples in the second embodiment and the third embodiment.

(Hardware Configuration)

The block diagrams used to describe the above embodiment show blocks by the function. These functional blocks (components) are implemented by any combination of at least one of hardware and software. A method of implementing the functional blocks is not limited. In other words, the functional blocks may be implemented by using a single physically or logically combined apparatus or may be implemented by directly or indirectly connecting two or more physically or logically separated apparatuses (by using, for example, wired connection or wireless connection) and using these multiple apparatuses.

For example, the radio base station, the user terminal, and the like in the embodiment of the present disclosure may function as a computer that executes a process of the wireless communication method of the present disclosure.

Figure 10:
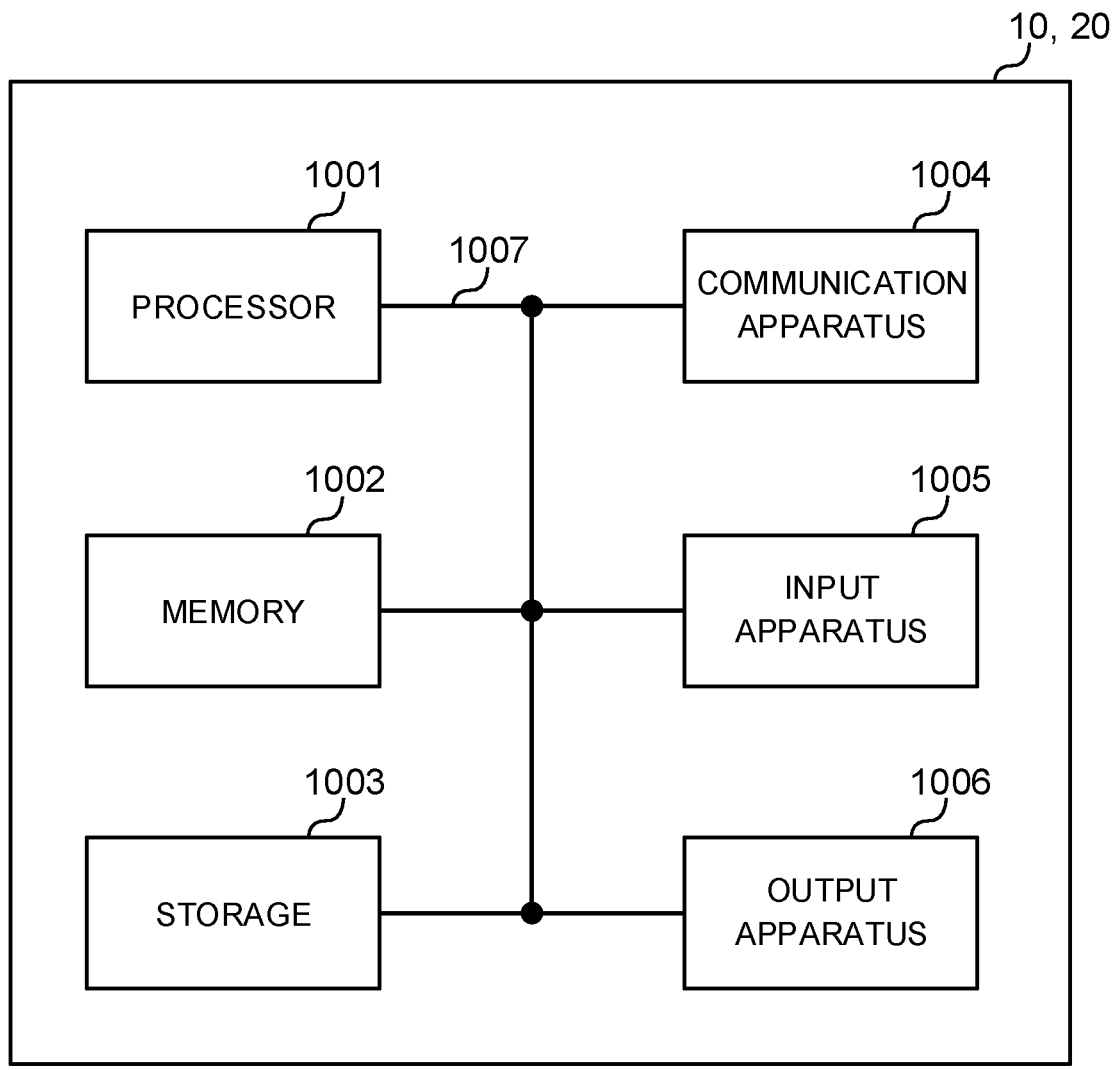
FIG. 10 is a diagram showing an example of the hardware configuration of each of the radio base station and the user terminal according to the embodiment.

FIG. 10 is a diagram showing an example of the hardware configuration of the radio base station and the user terminal according to the embodiment. The above-described radio base station 10 and the user terminal 20 may be physically made as a computer apparatus including a processor 1001, memory 1002, storage 1003, a communication apparatus 1004, an input apparatus 1005, an output apparatus 1006, a bus 1007, and the like.

In the following description, the term "apparatus" may be read as circuit, device, unit, or the like. The hardware configuration of each of the radio base station 10 and the user terminal 20 may be configured to include one or multiple of each of the apparatuses shown in the drawing or may be configured not to include part of the apparatuses.

For example, only one processor 1001 is illustrated; however, multiple processors may be provided. The process may be executed by a single processor or the processor may be executed by two or more processors simultaneously, sequentially, or by using other techniques. The processor 1001 may be implemented by one or more chips.

The functions in the radio base station 10 and the user terminal 20 are implemented by, for example, loading certain software (program) onto hardware, such as the processor 1001 and the memory 1002, to cause the processor 1001 to operate, control communications via the communication apparatus 1004, or control at least one of reading and writing of data in the memory 1002 and the storage 1003.

The processor 1001, for example, generally controls the computer by running an operating system. The processor 1001 may be a central processing unit (CPU) including an interface with a peripheral apparatus, a control apparatus, an arithmetic apparatus, a register, and the like. For example, the above-described baseband signal processing section 104 (204), the call processing section 105, and the like may be implemented by the processor 1001.

The processor 1001 reads out a program (program code), a software module, data, and the like from at least one of the storage 1003 and the communication apparatus 1004 onto the memory 1002 and executes various processes in accordance with them. A program that causes a computer to execute at least part of the operations described in the above-described embodiment is used as the program. The control section 401 of the user terminal 20 may be implemented by a control program that is stored in the memory 1002 and that operates on the processor 1001, and the other functional blocks may also be similarly implemented.

The memory 1002 is a computer-readable storage medium and may be at least one of, for example, ROM (read-only memory), EPROM (erasable programmable ROM), EEPROM (electrically EPROM), RAM (random access memory), and other appropriate storage media. The memory 1002 may be referred to as register, cache, main memory (main storage), or the like. The memory 1002 is capable of saving a program (program code), a software module, or the like that is executable to perform the wireless communication method according to the embodiment of the present disclosure.

The storage 1003 is a computer-readable storage medium and may be at least one of, for example, a flexible disk, a floppy (registered trademark) disk, a magneto-optical disk (for example, a compact disc (CD-ROM (Compact Disc ROM) or the like), a digital versatile disc, a Blu-ray (registered trademark) disc), a removable disk, a hard disk drive, a smart card, a flash memory device (for example, a card, a stick, or a key drive), a magnetic stripe, a database, a server, and other appropriate storage media. The storage 1003 may be referred to as auxiliary storage.

The communication apparatus 1004 is hardware (transmitting/receiving device) for performing communications between computers via at least one of a wired network and a wireless network and is referred to as, for example, network device, network controller, network card, communication module, or the like. The communication apparatus 1004 may be configured to include a radio-frequency switch, a duplexer, a filter, a frequency synthesizer, or the like in order to implement, for example, at least one of frequency division duplex (FDD) and time division duplex (TDD). For example, the above-described transmitting/receiving antenna 101 (201), the amplifying section 102 (202), the transmitting/receiving section 103 (203), the communication path interface 106, and the like may be implemented by the communication apparatus 1004.

The input apparatus 1005 is an input apparatus that accepts input from an outside (for example, a keyboard, a mouse, a microphone, a switch, a button, a sensor, or the like). The output apparatus 1006 is an output apparatus that performs output to an outside (for example, a display, a speaker, an LED (light emitting diode) lamp, or the like). The input apparatus 1005 and the output apparatus 1006 may be an integrated component (for example, a touch panel).

The apparatuses such as the processor 1001 and the memory 1002 are connected by the bus 1007 for communicating information. The bus 1007 may be a single bus or may be a set of different buses respectively between apparatuses.

The radio base station 10 and the user terminal 20 each may be configured to include hardware, such as a microprocessor, a digital signal processor (DSP), an ASIC (application specific integrated circuit), a PLD (programmable logic device), and an FPGA (field programmable gate array), and part or all of the functional blocks may be implemented by using the hardware. For example, the processor 1001 may be implemented by using at least one of these pieces of hardware.

(Modifications)

The terms described in the present disclosure and terms required to understand the present disclosure may be replaced with terms having the same or similar meanings. For example, at least one of a channel and a symbol may be a signal (signaling). A signal may be a message. A reference signal may be abbreviated as RS (reference signal) and may referred to as to as pilot, pilot signal, or the like depending on a standard applied. A component carrier (CC) may be referred to as cell, frequency carrier, carrier frequency, or the like.

A radio frame may be composed of one or multiple periods (frames) in time domain. Each of the one or multiple periods (frames) that compose a radio frame may be referred to as sub-frame. Furthermore, a sub-frame may be composed of one or multiple slots in time domain. A sub-frame may be a fixed time length (for example, 1 ms) independent of numerology.

A numerology may be a communication parameter that is applied to at least one of transmission and reception of a signal or a channel. A numerology may represent at least one of a sub-carrier spacing (SCS), a bandwidth, a symbol length, a cyclic prefix length, a transmission time interval (TTI), the number of symbols per TTI, a radio frame configuration, a specific filtering process that is executed by a transceiver in a frequency domain, a specific windowing process that is executed by a transceiver in a time domain, and the like.

A slot may be composed of one or multiple symbols (OFDM (orthogonal frequency division multiplexing) symbol, SC-FDMA (single carrier frequency division multiple access) symbol, or the like) in time domain. A slot may be a time unit based on numerology.

A slot may include multiple mini-slots. Furthermore, each mini-slot may be composed of one or multiple symbols in time domain. A mini-slot may be referred to as sub-slot. Each mini-slot may be composed of symbols less in number than slots. A PDSCH (or PUSCH) that is transmitted in time unit longer than mini-slot may be referred to as PDSCH (PUSCH) mapping type A. A PDSCH (or PUSCH) that is transmitted by using a mini-slot may be referred to as PDSCH (PUSCH) mapping type B.

A radio frame, a sub-frame, a slot, a mini-slot, and a symbol all represent a time unit in transmitting signals. A radio frame, a sub-frame, a slot, a mini-slot, and a symbol may be referred to as other corresponding names or may be read as one another.

For example, one sub-frame may be referred to as transmission time interval (TTI), multiple successive sub-frames may be referred to as TTI, or one slot or one mini-slot may be referred to as TTI. In other words, at least one of a sub-frame and a TTI may be a sub-frame (1 ms) in existing LTE or may be a period (for example, 1 to 13 symbols) shorter than 1 ms or may be a period longer than 1 ms. The unit of TTI may be referred to as not sub-frame but slot, mini-slot, or the like.

A TTI means, for example, a minimum scheduling time unit in wireless communication. For example, in an LTE system, a radio base station performs scheduling to allocate radio resources (a frequency bandwidth, a transmission power, or the like that user terminals are able to use) to the user terminals on a TTI basis. The definition of TTI is not limited thereto.

A TTI may be a transmission time unit of a channel-coded data packet (transport block), code block, code word, or the like or may be a processing unit, such as scheduling and link adaptation. When a TTI is given, a time section (for example, the number of symbols) in which a transport block, a code block, a code word, or the like is actually mapped may be shorter than the TTI.

When one slot or one mini-slot is referred to as TTI, one or more TTIs (that is, one or more slots or one or more mini-slots) may be a minimum scheduling time unit. The number of slots (the number of mini-slots) that compose the minimum scheduling time unit may be controlled.

A TTI having a time length of 1 ms may also be referred to as ordinary TTI (TTI in LTE Rel. 8 to 12), normal TTI, long TTI, ordinary sub-frame, normal sub-frame, long sub-frame, slot, or the like. A TTI shorter than an ordinary TTI may be referred to as shortened TTI, short TTI, partial or fractional TTI, shortened sub-frame, short sub-frame, mini-slot, sub-slot, slot, or the like.

A long TTI (for example, an ordinary TTI, a sub-frame, or the like) may be read as a TTI having a time length exceeding 1 ms. A short TTI (for example, a shortened TTI or the like) may be read as a TTI having a TTI length shorter than the TTI length of a long TTI and longer than or equal to 1 ms.

A resource block (RB) is a resource allocation unit in the time domain and the frequency domain, and may include one or multiple successive sub-carriers in the frequency domain.

An RB may include one or multiple symbols in the time domain and may have a length of one slot, one mini-slot, one sub-frame, or one TTI. One TTI and one sub-frame each may be composed of one or multiple resource blocks.

One or multiple RBs may be referred to as physical resource block (PRB: physical RB), sub-carrier group (SCG), resource element group (REG), PRB pair, RB pair, or the like.

A resource block may be composed of one or multiple resource elements (RE). For example, one RE may be a radio resource region of one sub-carrier and one symbol.

The structures of the above-described radio frame, sub-frame, slot, mini-slot, symbol, and the like are only illustrative. The configurations of, for example, the number of sub-frames included in a radio frame, the number of slots per sub-frame or per radio frame, the number of mini-slots included in a slot, the number of symbols and RBs included in a slot or a mini-slot, the number of sub-carriers included in an RB, the number of symbols in a TTI, a symbol length, a cyclic prefix (CP) length, and the like may be variously modified.

Information, parameters, and the like described in the present disclosure may be represented by absolute values or may be represented by relative values relative to certain values or may be represented by other corresponding information. For example, radio resources may be indicated by a certain index.

Names used for parameters and the like in the present disclosure are not restrictive names in all respects. Furthermore, mathematical expressions and the like that use these parameters may be different from the ones explicitly described in the present disclosure. Various channels (PUCCH (physical uplink control channel), PDCCH (physical downlink control channel), and the like) and information elements may be identified by any appropriate names, so various names assigned to these various channels and information elements are not restrictive names in all respects.

Information, signals, and the like described in the present disclosure may be represented by using any of various different techniques. For example, data, instruction, command, information, signal, bit, symbol, chip, and the like that can be referred to over the entire description may be represented by voltage, current, electromagnetic wave, magnetic field or magnetic particle, optical field or photon, or any combination of them.

Information, signals, and the like can be output in at least one of a direction from an upper layer to a lower layer and a direction from a lower layer to an upper layer. Information, signals, and the like may be input or output via multiple network nodes.

Input or output information, signals, and the like may be saved in a specific location (for example, memory) and may be managed by using a management table. Input or output information, signals, and the like can be overwritten, updated, or added. Output information, signals, and the like may be deleted. Input information, signals, and the like may be transmitted to other apparatuses.

Provision of information is not limited to the embodiments described in the present disclosure and may be performed by using other methods. Provision of information may be performed by using, for example, physical layer signaling (for example, downlink control information (DCI) or uplink control information (UCI)), upper layer signaling (for example, RRC (radio resource control) signaling, broadcast information (master information block (MIB), system information block (SIB), or the like), or MAC (medium access control) signaling), other signals, or any combination of them.

Physical layer signaling may referred to as to as L1/L2 (Layer 1/Layer 2) control information (L1/L2 control signal), L1 control information (L1 control signal), or the like. RRC signaling may be referred to as RRC message and may be, for example, an RRC connection setup message, an RRC connection reconfiguration message, or the like. MAC signaling may be provided by using, for example, MAC control element (MAC CE).

Provision of certain information (for example, information that it is X) is not limited to explicit provision of information and may be performed implicitly (by, for example, not providing the certain information or providing other information).

A determination may be performed in accordance with a value represented by one bit (0 or 1) or may be performed by Boolean represented by true or false or may be performed by numeric comparison (for example, comparison with a certain value).

Software, regardless of whether it is referred to as software, firmware, middleware, microcode, or hardware description language, or other names, should be widely interpreted to mean instruction, instruction set, code, code segment, program code, program, sub-program, software module, application, software application, software package, routine, sub-routine, object, executable file, execution thread, procedure, function, or the like.

Software, instruction, information, or the like may be transmitted or received via transmission media. When, for example, software is transmitted from a website, a server, or other remote sources by using at least one of a wired technology (such as a coaxial cable, an optical fiber cable, twisted pair, and a digital subscriber line (DSL)) and a wireless technology (such as infrared and microwave), at least one of the wired technology and the wireless technology is included in the definition of transmission media.

The terms "system" and "network" that are used in the present disclosure can be used interchangeably.

In the present disclosure, the terms "base station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", "bandwidth part (BWP)", and the like can be used interchangeably. A base station may be referred to as a term, such as macrocell, small cell, femtocell, and picocell.

A base station may contain one or multiple (for example, three) cells (also referred to as sectors). When a base station contains multiple cells, the overall coverage area of the base station may be divided into multiple smaller areas, and each of the smaller areas is capable of providing communication service by means of a base station sub-system (for example, an indoor small base station (RRH: remote radio head)). The term "cell" or "sector" represents part or all of the coverage area of at least one of a base station and a base station sub-system that provide communication service in the coverage area.

In the present disclosure, the terms "mobile station (MS)", "user terminal", "user equipment (UE)", and "terminal" can be used interchangeably.

A mobile station may be referred to as subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other appropriate terms.

At least one of a base station and a mobile station may be referred to as transmission apparatus, reception apparatus, or the like. At least one of a base station and a mobile station may be a device mounted on a mobile object, a mobile object itself, or the like. The mobile object may be a vehicle (for example, a car, an airplane, or the like) or may be an unattended mobile object (for example, a drone, a self-driving car, or the like) or a robot (an attended type or an unattended type). At least one of a base station and a mobile station includes an apparatus that does not necessarily move during communication operation.

A radio base station in the present disclosure may be read as user terminal. For example, the aspects/embodiments of the present disclosure may be applied to a configuration in which communications between a radio base station and a user terminal are replaced with communications between multiple user terminals (which may be referred to as, for example, D2D (device-to-device), V2X (vehicle-to-everything), or the like). In this case, the functions of the above-described radio base station 10 may be provided as the components of the user terminal 20. The terms "uplink", "downlink", and the like may be read as a term corresponding to inter-terminal communications (for example, "side"). For example, an uplink channel, a downlink channel, and the like may be read as side channels.

Similarly, a user terminal in the present disclosure may be read as a radio base station. In this case, the functions of the above-described user terminal 20 may be provided as the components of the radio base station 10.

In the present disclosure, operations that are performed by a base station may be performed by an upper node of a base station. It is apparent that, in a network including one or multiple network nodes including a base station, various operations that are performed to communicate with terminals can be performed by the base station, one or more network nodes (for example, MME (mobility management entity), S-GW (serving-gateway), or the like, is conceivable; however, network nodes are not limited thereto) other than the base station, or any combination of them.

The aspects/embodiments described in the present disclosure may be used solely or may be used in combination or may be switched and used according to execution. The procedures, sequences, flowcharts, and the like of the aspects/embodiments described in the present disclosure may be changed in order without any contradiction. For example, for the method described in the present disclosure, elements of various steps are provided in illustrative order; however, the elements of various steps are not limited to the provided specific order.

The aspects/embodiments described in the present disclosure may be applied to a system that uses LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), or other appropriate wireless communication methods, a next generation system extended based on any one of them, or the like. Multiple systems may be combined (for example, a combination of LTE or LTE-A and 5G, or the like) and applied.

The phrase "based on" that is used in the present disclosure does not mean "only based on" unless otherwise specified. In other words, the phrase "based on" means both "only based on" and "at least based on".

Any reference to an element, using designations such as "first" and "second" that are used in the present disclosure, does not generally limit the quantity or order of those elements. These designations can be used in the present disclosure as a convenient method to distinguish two or more elements from each other. Therefore, references to first and second elements do not mean that only two elements can be employed or the first element must precede the second element in some way.

The term "determining" that is used in the present disclosure may include diverse operations. For example, "determining" may be regarded as determining as to judging, calculating, computing, processing, deriving, investigating, looking up (for example, looking up in a table, a database, or another data structure), ascertaining, or the like.

"Determining" may also be regarded as determining as to receiving (for example, receiving information), transmitting (for example, transmitting information), input, output, accessing (for example, accessing data in memory), or the like.

"Determining" may also be regarded as determining as to resolving, selecting, choosing, establishing, comparing, or the like. In other words, "determining" may be regarded as determining some kind of operation.

"Determining" may be read as "assuming", "expecting", "considering", or the like.

The terms "connected" and "coupled" that are used in the present disclosure, or all modifications of these terms mean every direct or indirect connection or coupling between two or more elements, and one or more intermediate elements may be included between two elements "connected" or "coupled" to each other. Coupling or connection between elements may be physical, logical, or in combination of them. For example, "connection" may be read as "access".

In the present disclosure, when two elements are connected, it may be understood that the two elements are "connected" or "coupled" to each other by using one or more wires, cables, printed electrical connections, or the like, or, as some non-restrictive and non-inclusive examples, by using electromagnetic energy having a wavelength in a radio frequency range, a microwave range, an optical (both visible and invisible) range, or the like.

In the present disclosure, the term "A and B are different" may mean that "A and B are different from each other". The terms "separated", "coupled", and the like may also be similarly interpreted.

In the present disclosure, when "include", "including", and modifications of them are used, these terms are intended to be inclusive, as well as the term "comprising". Furthermore, the term "or" that is used in the present disclosure is intended not to be exclusive disjunction (exclusive or).

In the present disclosure, for example, when articles are added through translation as in the case of "a", "an", and "the" in English, the present disclosure may include the meaning that nouns following those articles are plural.

The invention according to the present disclosure is described in detail above. It is apparent to persons skilled in the art that the invention according to the present disclosure is not limited to the embodiments described in the present disclosure. The invention according to the present disclosure may be implemented as modes including alterations and modifications without departing from the spirit and scope of the invention, which are determined based on the claims.

Therefore, the present disclosure is intended to provide illustrative description and does not provide any restrictive meaning on the invention according to the present disclosure.

The invention claimed is:

1. A terminal comprising:
    a receiver that receives a channel state information reference signal (CSI-RS); and
    a processor that, when the processor is able to assume, based on information regarding whether a neighbor cell is synchronous with a serving cell, that the neighbor cell is synchronous with the serving cell, and when an intra-band carrier aggregation (CA) is configured, applies a scheduling restriction of a Physical Uplink Shared Channel (PUSCH), a Physical Uplink Control Channel (PUCCH), a Sounding Reference Signal (SRS), a Physical Downlink Shared Channel (PDSCH), a Physical Downlink Control Channel (PDCCH) and a CSI-RS at an intra-frequency measurement timing of the CSI-RS to all serving cells in a same band.

2. The terminal according to claim 1, wherein when the processor performs a measurement of the CSI-RS in a time division duplex (TDD) band, the processor does not expect to transmit data having numerology different from that of the CSI-RS on a symbol of the CSI-RS and one symbol before and one symbol after the symbol of the CSI-RS.

3. The terminal according to claim 2, wherein when the processor performs a measurement of the CSI-RS in a certain frequency band, the processor does not expect to transmit or receive data having numerology different from that of the CSI-RS on a symbol of the CSI-RS.

4. The terminal according to claim 1, wherein when the processor performs a measurement of the CSI-RS in a certain frequency band, the processor does not expect to transmit or receive data having numerology different from that of the CSI-RS on a symbol of the CSI-RS.

5. The terminal according to claim 4, wherein the certain frequency band is a frequency band above 24 GHz.

6. A radio communication method for a terminal, comprising:
    receiving a channel state information reference signal (CSI-RS); and
    when the terminal is able to assume, based on information regarding whether a neighbor cell is synchronous with a serving cell, that the neighbor cell is synchronous with the serving cell, and when an intra-band carrier aggregation (CA) is configured, applying a scheduling restriction of a Physical Uplink Shared Channel (PUSCH), a Physical Uplink Control Channel (PUCCH), a Sounding Reference Signal (SRS), a Physical Downlink Shared Channel (PDSCH), a Physical Downlink Control Channel (PDCCH) and a CSI-RS at an intra-frequency measurement timing of the CSI-RS to all serving cells in a same band.

7. A base station comprising:
    a transmitter that transmits a channel state information reference signal (CSI-RS) to a terminal; and
    a processor that generates information based on which it is able to assume that a neighbor cell is synchronous with a serving cell, and configures an intra-band carrier aggregation (CA), in order to make the terminal perform a control for applying a scheduling restriction of a Physical Uplink Control Channel (PUSCH), a Physical Uplink Control Channel (PUCCH), a Sounding Reference Signal (SRS), a Physical Downlink Shared Channel (PDSCH), a Physical Downlink Control Channel (PDCCH) and a CSI-RS at an intra-frequency measurement timing of the CSI-RS to all serving cells in a same band.

8. A system comprising a terminal and a base station; wherein the terminal comprises:
- a receiver that receives a channel state information reference signal (CSI-RS); and
- a first processor that, when the first processor is able to assume, based on information regarding whether a neighbor cell is synchronous with a serving cell, that the neighbor cell is synchronous with the serving cell, and when an intra-band carrier aggregation (CA) is configured, applies a scheduling restriction of a Physical Uplink Shared Channel (PUSCH), a Physical Uplink Control Channel (PUCCH), a Sounding Reference Signal (SRS), a Physical Downlink Shared Channel (PDSCH), a Physical Downlink Control Channel (PDCCH) and a CSI-RS at an intra-frequency measurement timing of the CSI-RS to all serving cells in a same band, and the base station comprises:
- a transmitter that transmits the CSI-RS to the terminal; and
- a second processor that generates the information and configures the CA.

* * * * *